United States Patent
Foster et al.

(10) Patent No.: US 9,902,632 B2
(45) Date of Patent: *Feb. 27, 2018

(54) WASTE TREATMENT METHOD

(71) Applicant: Earth Renewal Group, LLC, Salt Lake City, UT (US)

(72) Inventors: George G. Foster, Salt Lake City, UT (US); Frederick P. Kesler, Salt Lake City, UT (US); Malcolm Draper, New York City, NY (US); Shannon L. Comp, Cedar City, UT (US)

(73) Assignee: Earth Renewal Group, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,031

(22) Filed: Apr. 3, 2017

(65) Prior Publication Data

US 2017/0203983 A1 Jul. 20, 2017

Related U.S. Application Data

(60) Division of application No. 15/044,354, filed on Feb. 16, 2016, now Pat. No. 9,611,158, which is a division of application No. 13/936,932, filed on Jul. 8, 2013, now Pat. No. 9,272,936, which is a continuation-in-part of application No. 12/416,431, filed on Apr. 1, 2009, now Pat. No. 8,481,800, and a continuation-in-part of application No. 13/250,308, filed on Sep. 30, 2011, now abandoned.

(60) Provisional application No. 61/388,164, filed on Sep. 30, 2010.

(51) Int. Cl.
| | |
|---|---|
| *A62D 3/30* | (2007.01) |
| *C02F 1/72* | (2006.01) |
| *C02F 11/06* | (2006.01) |
| *C05B 17/02* | (2006.01) |
| *C02F 103/32* | (2006.01) |
| *C02F 103/20* | (2006.01) |
| *C02F 101/20* | (2006.01) |

(52) U.S. Cl.
CPC .............. *C02F 1/727* (2013.01); *C02F 11/06* (2013.01); *C05B 17/02* (2013.01); *C02F 2101/20* (2013.01); *C02F 2103/20* (2013.01); *C02F 2103/32* (2013.01)

(58) Field of Classification Search
CPC ........................................................ A62D 3/30
USPC ....... 588/302, 313, 318, 320, 400, 406, 408, 588/900
See application file for complete search history.

(56) References Cited

U.S. PATENT DOCUMENTS

| | | |
|---|---|---|
| 3,637,371 A | 1/1972 | Mackiw et al. |
| 3,649,665 A | 3/1972 | Chafetz et al. |
| 3,793,429 A | 2/1974 | Queneau et al. |
| 3,939,280 A | 2/1976 | Karnemaat |
| 3,953,577 A | 4/1976 | Ooka et al. |
| 3,960,718 A | 6/1976 | Lebo |
| 4,045,279 A | 8/1977 | Nagano et al. |
| 4,076,579 A | 2/1978 | Brink |
| 4,081,366 A | 3/1978 | O'Donnell |
| 4,084,961 A | 4/1978 | Caldon |
| 4,132,636 A | 1/1979 | Iwase et al. |
| 4,141,829 A | 2/1979 | Thiel et al. |
| 4,193,970 A | 3/1980 | Sefton et al. |
| 4,235,858 A | 11/1980 | Blakey et al. |
| 4,239,613 A | 12/1980 | Schulz |
| 4,272,383 A | 6/1981 | McGrew |
| 4,277,342 A | 7/1981 | Hayes |
| 4,606,763 A | 8/1986 | Weir |
| 4,647,307 A | 3/1987 | Raudsepp et al. |
| 4,692,252 A | 9/1987 | Atwood et al. |
| 4,744,908 A | 5/1988 | Peterscheck et al. |
| 4,793,919 A | 12/1988 | McCorquodale |
| 4,803,054 A | 2/1989 | Sillerud et al. |
| 4,849,025 A | 7/1989 | Bain et al. |
| 4,878,945 A | 11/1989 | Raudsepp et al. |
| 4,891,139 A | 1/1990 | Zeigler et al. |
| 4,897,156 A | 1/1990 | Samuelson |
| 5,057,220 A | 10/1991 | Harada et al. |
| 5,057,231 A | 10/1991 | Mueller et al. |
| 5,106,513 A | 4/1992 | Hong |
| 5,118,337 A | 6/1992 | Bleeker |
| 5,125,951 A | 6/1992 | Lahoda et al. |
| 5,125,977 A | 6/1992 | Grohmann et al. |
| 5,183,577 A | 2/1993 | Lehmann |
| 5,192,453 A | 3/1993 | Keckler et al. |
| 5,232,604 A | 8/1993 | Swallow et al. |
| 5,236,492 A | 8/1993 | Shaw et al. |
| 5,240,619 A | 8/1993 | Copa et al. |
| 5,250,193 A | 10/1993 | Sawicki et al. |
| 5,252,224 A | 10/1993 | Modell et al. |
| 5,262,060 A | 11/1993 | Lehmann et al. |
| 5,302,298 A | 4/1994 | Leitzke |
| 5,316,567 A | 5/1994 | Jones |

(Continued)

FOREIGN PATENT DOCUMENTS

| | | |
|---|---|---|
| EP | 0 119 685 | 1/1984 |
| EP | 0 413 356 B1 | 8/1990 |

(Continued)

OTHER PUBLICATIONS

International Search Report and Written Opinion, PCT/US2011/054075, dated Jan. 16, 2012 (19 pp.).

(Continued)

*Primary Examiner* — Edward Johnson
(74) *Attorney, Agent, or Firm* — Holland & Hart LLP

(57) ABSTRACT

An improved oxidation process may be used to oxidize a wide variety of feedstocks. Oxidation takes place in a reactor where the feedstock is mixed with an oxidizing acid, such as nitric acid. The reaction mixture may also include another oxidizing acid such as sulfuric acid.

26 Claims, 7 Drawing Sheets

(56) References Cited

U.S. PATENT DOCUMENTS

| | | | |
|---|---|---|---|
| 5,338,673 A | 8/1994 | Thepenier et al. |
| 5,364,444 A | 11/1994 | McDoulett, Jr. et al. |
| 5,368,750 A | 11/1994 | Peterscheck et al. |
| 5,370,801 A | 12/1994 | Soresen et al. |
| 5,374,710 A | 12/1994 | Tsien et al. |
| 5,387,751 A | 2/1995 | Hayden et al. |
| 5,407,817 A | 4/1995 | Lightsey et al. |
| 5,411,568 A | 5/1995 | Moore |
| 5,417,937 A | 5/1995 | Voigt et al. |
| 5,422,015 A | 6/1995 | Angell et al. |
| 5,425,800 A | 6/1995 | Buter et al. |
| 5,427,747 A | 6/1995 | Kong et al. |
| 5,431,788 A | 7/1995 | Jones |
| 5,437,150 A | 8/1995 | Latham et al. |
| 5,443,613 A | 8/1995 | Robinson |
| 5,453,253 A | 9/1995 | Von Röpenack et al. |
| 5,454,950 A | 10/1995 | Li et al. |
| 5,478,549 A | 12/1995 | Koch |
| 5,482,528 A | 1/1996 | Angell et al. |
| 5,484,579 A | 1/1996 | O'Brien |
| 5,491,968 A | 2/1996 | Shouman |
| 5,492,624 A | 2/1996 | Rozich |
| 5,498,766 A | 3/1996 | Stuart et al. |
| 5,501,974 A | 3/1996 | Griffin |
| 5,512,525 A | 4/1996 | Tenten et al. |
| 5,512,599 A | 4/1996 | Hiramatsu et al. |
| 5,516,345 A | 5/1996 | Brown |
| 5,525,230 A | 6/1996 | Wrigley et al. |
| 5,536,325 A | 7/1996 | Brink |
| 5,552,039 A | 9/1996 | McBrayer, Jr. et al. |
| 5,578,647 A | 11/1996 | Li et al. |
| 5,582,715 A | 12/1996 | McBrayer, Jr. et al. |
| 5,591,415 A | 2/1997 | Dassel et al. |
| 5,641,413 A | 6/1997 | Momont et al. |
| 5,720,889 A | 2/1998 | McBrayer, Jr. et al. |
| 5,770,174 A | 6/1998 | Eller et al. |
| 5,779,164 A | 7/1998 | Chieffalo et al. |
| 5,814,292 A | 9/1998 | Foster et al. |
| 5,854,061 A | 12/1998 | Horn |
| 5,888,389 A | 3/1999 | Griffith et al. |
| 5,960,368 A | 9/1999 | Pierce et al. |
| 5,968,362 A | 10/1999 | Russo, Jr. |
| 5,976,211 A | 11/1999 | Fjelldal et al. |
| 6,001,243 A | 12/1999 | Eller et al. |
| 6,051,145 A | 4/2000 | Griffith et al. |
| 6,054,057 A | 4/2000 | Hazlebeck et al. |
| 6,056,880 A | 5/2000 | Boss et al. |
| 6,121,179 A | 9/2000 | McBrayer, Jr. et al. |
| 6,682,578 B2 | 1/2004 | Sower |
| 6,958,122 B1 | 10/2005 | Gidner et al. |
| 6,966,941 B1 | 11/2005 | Grobler et al. |
| 7,169,204 B2 | 1/2007 | Greer et al. |
| 7,662,206 B2 | 2/2010 | Burnham |
| 7,682,811 B2 | 3/2010 | Leschine et al. |
| 8,481,800 B2 * | 7/2013 | Foster | C02F 11/06 588/302 |
| 9,272,936 B2 * | 3/2016 | Foster | C02F 11/06 |
| 2001/0008617 A1 | 7/2001 | Robles |
| 2001/0022290 A1 | 9/2001 | Shiota et al. |
| 2002/0056690 A1 | 5/2002 | Wegner |
| 2002/0182710 A1 | 12/2002 | Horn et al. |
| 2003/0066806 A1 | 4/2003 | Brudeniuc |
| 2003/0121302 A1 | 7/2003 | Oliver et al. |
| 2003/0167811 A1 | 9/2003 | Porubcan |
| 2004/0076567 A1 | 4/2004 | Day et al. |
| 2007/0062233 A1 | 3/2007 | Burnham |
| 2008/0047313 A1 | 2/2008 | Johnson et al. |
| 2008/0182305 A1 | 7/2008 | Foody et al. |
| 2008/0230484 A1 | 9/2008 | Burnham et al. |
| 2009/0028767 A1 | 1/2009 | Parker et al. |
| 2010/0055628 A1 | 3/2010 | McMurry et al. |
| 2010/0064747 A1 | 3/2010 | Greer et al. |
| 2010/0120104 A1 | 5/2010 | Reed |
| 2010/0129909 A1 | 5/2010 | Stuart |

FOREIGN PATENT DOCUMENTS

| | | |
|---|---|---|
| EP | 0 513 186 B1 | 1/1991 |
| EP | 0 568 736 A1 | 11/1993 |
| GB | 1407520 | 6/1973 |
| GB | 1591274 | 11/1977 |
| JP | S55-142300 | 11/1980 |
| JP | 1310794 | 12/1989 |
| JP | 5293496 | 9/1993 |
| JP | H10-43710 | 2/1998 |
| JP | H11-512340 | 10/1999 |
| JP | 2002-045823 | 2/2002 |
| JP | 2003-299941 | 10/2003 |
| WO | WO 93/14046 | 7/1993 |
| WO | WO 94/11310 | 5/1994 |
| WO | WO 94/17216 | 8/1994 |
| WO | WO 95/26929 | 10/1995 |
| WO | WO 96/02471 | 2/1996 |
| WO | WO 96/19412 | 6/1996 |
| WO | WO 99/35084 | 7/1999 |
| WO | WO 00/14120 | 3/2000 |
| WO | WO 2004/099115 A1 | 11/2004 |
| WO | WO 2004/105974 A2 | 12/2004 |
| WO | WO 2005/113104 A1 | 12/2005 |
| WO | WO 2009/059615 A1 | 5/2009 |

OTHER PUBLICATIONS

International Search Report and Written Opinion, PCT/US2010/028340, dated Dec. 8, 2010 (12 pgs.).

Invitation to Pay Additional Fees, PCT/US2010/028340, dated Jun. 25, 2010 (6 pgs.).

Satoh, Kenichi, et al., Kankyo Gijutsu (Journal of Environmental Engineering) vol. 15, No. 10, pp. 813-817 (1986) (5 pp.).

Emerging Biosolids Treatment Technologies Fact Sheet, National Biosolids Partnership, PDF file created on Jan. 9, 2013 (7 pp.).

Information about Related Patents, Patent Applications, and Patent Office Proceedings see the section below having the same title.

U.S. Pat. No. 9,611,158, Apr. 4, 2017, U.S. Appl. No. 15/044,354, filed Feb. 16, 2016, Foster, Waste Treatment Process.

U.S. Pat. No. 9,272,936, Mar. 1, 2016, U.S. Appl. No. 13/936,932, filed Jul. 8, 2013, Foster, Waste Treatment Process.

2012/0080383, Apr. 5, 2012, U.S. Appl. No. 13/250,308, filed Sep. 30, 2011, Kesler, Waste Treatment Process.

U.S. Pat. No. 7,951,988, Oct. 7, 2010, U.S. Appl. No. 12/416,412, filed Apr. 1, 2009, Foster, Improved Aqueous Phase Oxidation Process.

U.S. Pat. No. 8,115,047, Oct. 7, 2010, U.S. Appl. No. 12/416,419, filed Apr. 1, 2009, Foster, Improved Aqueous Phase Oxidation Process.

U.S. Pat. No. 7,951,474, Oct. 7, 2010, U.S. Appl. No. 12/416,424, filed Apr. 1, 2009, Foster, Improved Aqueous Phase Oxidation Process.

U.S. Pat. No. 8,481,800, Oct. 7, 2010, U.S. Appl. No. 12/416,431, filed Apr. 1, 2009, Foster, Improved Aqueous Phase Oxidation Process.

U.S. Pat. No. 8,168,847, Oct. 7, 2010, U.S. Appl. No. 12/416,438, filed Apr. 10, 2009, Foster, Improved Aqueous Phase Oxidation Process.

* cited by examiner

WASTE TREATMENT METHOD

CROSS-REFERENCE TO RELATED PATENT APPLICATIONS

This is a divisional of U.S. patent application Ser. No. 15/044,354, titled "Waste Treatment Process," filed on 16 Feb. 2016, issued as U.S. Pat. No. 9,611,158, which is a divisional of U.S. patent application Ser. No. 13/936,932, titled "Waste Treatment Process," filed on 8 Jul. 2013, issued as U.S. Pat. No. 9,272,936, which is a continuation-in-part of U.S. patent application Ser. No. 12/416,431, titled "Aqueous Phase Oxidation Process," filed on 1 Apr. 2009, issued as U.S. Pat. No. 8,481,800, and a continuation-in-part of U.S. patent application Ser. No. 13/250,308, titled "Waste Treatment Process," filed on 30 Sep. 2011, published as U.S. Pat. App. Pub. No. 2012/0080383, which claims the benefit of U.S. Prov. patent application Ser. No. 61/388,164, titled "Method for Treating Sewage Sludge," filed on 30 Sep. 2010, the entire contents of all these documents being incorporated by reference herein. In the event of a conflict, the subject matter explicitly recited or shown herein controls over any subject matter incorporated by reference. The incorporated subject matter should not be used to limit or narrow the scope of the explicitly recited or depicted subject matter.

INCORPORATION OF RELATED PATENT APPLICATIONS

The entire contents of the following document are incorporated by reference herein: U.S. Pat. No. 5,814,292, titled "Comprehensive Energy Producing Methods for Aqueous Phase Oxidation," issued on 29 Sep. 1998. In the event of a conflict, the subject matter explicitly recited or shown herein controls over any subject matter incorporated by reference. The incorporated subject matter should not be used to limit or narrow the scope of the explicitly recited or depicted subject matter.

BACKGROUND

Modern civilization produces a large quantity of organic waste. It originates from household, commercial, institutional, and industrial waste and can include materials such as sewage sludge, animal manure, potato skins, slaughterhouse runoff, and so forth.

One of the biggest sources of organic waste is sewage material. Sewage material refers broadly to sewage sludge, dewatered sewage, animal waste, lagoon sludge, and the like. Sewage material is most commonly produced by wastewater treatment processes such as those used in municipal sewage treatment plants, large scale animal production facilities, and the like.

Sewage material contains valuable nutrients that would be desirable to capture and use in a safe and renewable manner such as in fertilizer. Transforming sewage material from waste into a valuable resource produces tremendous environmental benefits. The alternative is to dispose of the sewage material in less desirable ways such as incineration or deposition in a landfill, lagoon, or the ocean.

Unfortunately, there are a number of obstacles that have prevented the widespread use of sewage material for fertilizer. One of the biggest obstacles is the presence of toxic materials in the fertilizer such as heavy metals, pathogens, drug residues, and the like. These materials originate with the sewage material and are difficult to remove when it is processed to make fertilizer. Other obstacles include the potential for applying too much or too little of each nutrient and the possible detrimental effects on water quality from leaching, erosion, or runoff losses.

Regulatory restrictions have been placed on the use of fertilizer derived from sewage material due to these obstacles. There are restrictions that prevent the fertilizer from being used on land that exceeds a certain slope or has certain soil conditions. There are restrictions on how close it can be applied to homes, wells, streams, roads, and property lines. There are also restrictions that limit the quantity of heavy metals (arsenic, cadmium, chromium, cobalt, copper, mercury, molybdenum, nickel, lead, selenium, and zinc) that can be applied to a given area. Once these limits are reached, no more fertilizer can be added, but the land can still be used for normal crop production.

Numerous attempts have been made over the years to develop a process to dispose of organic waste materials in an effective and cost efficient manner. Unfortunately, most of these processes consume large amounts of energy, emit noxious gases, and rarely achieve the desired conversion rate.

An earlier process oxidized the waste material in a solution of nitric and sulfuric acid. The reaction occurred in a pressurized reactor that was maintained at a temperature of no more than 210° C. Oxygen gas was added to facilitate the reaction and breakdown of the waste material.

The process successfully transformed the waste material into materials such as oxygen, nitrogen, water, carbon dioxide, and so forth. However, the solution included a high concentration of nitric and sulfuric acid and much of it was consumed in the process. This made the economics of the process challenging since it consumed large amounts of relatively expensive acid and produced mostly low value end products.

A number of embodiments of an improved process for eliminating waste material and/or transforming it into a commercially valuable end product are described below. The process is especially suited for converting sewage materials into fertilizer and other useful materials. The process reduces or eliminates many of the problems and disadvantages associated with conventional processes.

SUMMARY

A number of representative embodiments are provided to illustrate the various features, characteristics, and advantages of the waste treatment process. The embodiments are provided primarily in the context of treating sewage material. It should be understood, however, that many of the concepts can be used in a variety of other settings, situations, and configurations. For example, the features, characteristics, advantages, etc., of one embodiment can be used alone or in various combinations and sub-combinations with one another.

A waste treatment process includes reacting a feedstock in a reactor with a first oxidizing acid and nitric acid. The process can be used to treat any feedstock. Examples of suitable feedstocks include sewage material such as dewatered sewage, municipal sludge cake, animal manure, and the like. Other feedstocks include potato skins, produce waste, municipal waste, farm waste, and the like. In one embodiment, the process is used to treat sewage material and transform it into fertilizer and/or biofuel.

In one embodiment, the feedstock is an organic feedstock. The organic feedstock can include other materials. However, it is preferable for the feedstock to include, on a dry basis, a substantial amount of organic material thereby rendering it an organic feedstock. In one embodiment, the organic feedstock includes 20 wt % to 100 wt % organic material on a dry basis (i.e., excluding water).

The feedstock is oxidized in an aqueous reaction mixture that includes one or more oxidizing acids. The oxidizing acid is supplied in an amount that is sufficient to oxidize the feedstock and produce the desired reaction products. In one embodiment, the feedstock and the oxidizing acid are part of a reaction mixture that includes no more than approximately 7.5 wt % oxidizing acid. The reaction mixture can also have a pH of approximately 0.5 to 2.0. The reaction mixture can include oxidizing acids such as sulfuric acid and/or nitric acid.

The amount of solids in the feedstock and oxidizing acid in the reaction mixture can vary widely depending on the circumstances. In general, these materials should be supplied in amounts sufficient for the reaction to proceed relatively quickly (10 s to 2 min reaction time) and still produce desirable reaction products—e.g., a nonviscous liquid that includes a readily separable solid fraction.

The weight ratio of solids to oxidizing acid in the reaction mixture can be at least 0.2. The weight ratio of solids to the first oxidizing acid can be at least 0.3. The weight ratio of solids to nitric acid can be at least 0.5. If the feedstock is an organic feedstock, then the weight ratio of organic material to oxidizing acid in the reaction mixture can be at least 0.2. The weight ratio of organic material to the first oxidizing acid can be at least 0.3. The weight ratio of organic material to nitric acid can be at least 0.5.

The feedstock can be processed before being fed to the reactor to give it uniform physical properties and to make it better suited to be rapidly and efficiently oxidized. This can include comminuting the feedstock to a uniform size that allows the feedstock to easily enter the reactor, combining the feedstock with recycled effluent from the reactor, and/or combining the feedstock with one or more oxidizing acids before the feedstock enters the reactor.

Oxygen gas can be supplied to the reactor to facilitate oxidation of the feedstock and potentially reoxidize the reduction products of the oxidizing acid thereby regenerating the acid in situ. The oxygen gas can be added to the reaction mixture in a variety of ways. For example, it can be injected into the reaction mixture, added to the headspace of the reactor, bubbled into the liquid, or added in any other suitable manner. The reactor is maintained at suitable pressures and temperatures to facilitate the reaction between the organic material and the oxidizing acid and/or regeneration of the oxidizing acid.

The process produces a runny effluent having a solid fraction (or solid component) and a liquid fraction (or liquid component). The solid fraction is 2 to 10 wt % of the effluent and the liquid fraction is the rest. The hydrocarbon material in the solid fraction can include at least 25 wt % fatty acid esters, at least 50 wt % fatty acid esters, or at least 75 wt % fatty acid esters. The fatty acid esters can be mono-alkyl esters of long chain fatty acids. The weight ratio of carbon to nitrogen in the solid fraction is more than two times the weight ratio of carbon to nitrogen in the liquid fraction.

The effluent exits the reactor and is cooled. The pressure is also reduced and any dissolved gas separates. The effluent can be vigorously agitated to speed up the separation and make it more complete. The solids are separated from the effluent.

The liquid fraction of the effluent can contain heavy metals, especially if the feedstock is sewage material. The heavy metals can be separated in a variety of ways. One way is to allow the liquid fraction to sit undisturbed for a sufficient period of time for the heavy metals to precipitate out of the solution. The remaining liquid can be drawn off the top and mixed with ammonia to neutralize any residual acid and produce liquid fertilizer. Another way to remove the heavy metals is with an ion exchange material.

The solid fraction can also include heavy metals. These can be removed using a variety of techniques. In one embodiment, the heavy metals are removed from the liquid fraction in the manner described above and the resulting liquid can be used as a solvent to extract additional heavy metals from the solid effluent. The heavy metals can then be separated from the liquid by precipitation.

It should be appreciated that all pressures referred to herein are gauge pressures unless stated otherwise. Also, all references to molarity are given at standard conditions for temperature and pressure—i.e., 0° C. and 101.325 kPa—unless stated otherwise.

The foregoing and other features, utilities, and advantages of the subject matter described herein will be apparent from the following more particular description of certain embodiments as illustrated in the accompanying drawings.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which.

DETAILED DESCRIPTION

The process described, in its various embodiments, can be used to oxidize a wide variety of materials. The process is especially suited for oxidizing organic materials such as sewage materials and food waste, but it can also be used to oxidize other materials as well. Specific materials that may be oxidized using this process include, but are not limited to, food waste and municipal and farm waste including dewatered sewage, municipal sludge cake and animal manure.

Figure 1:
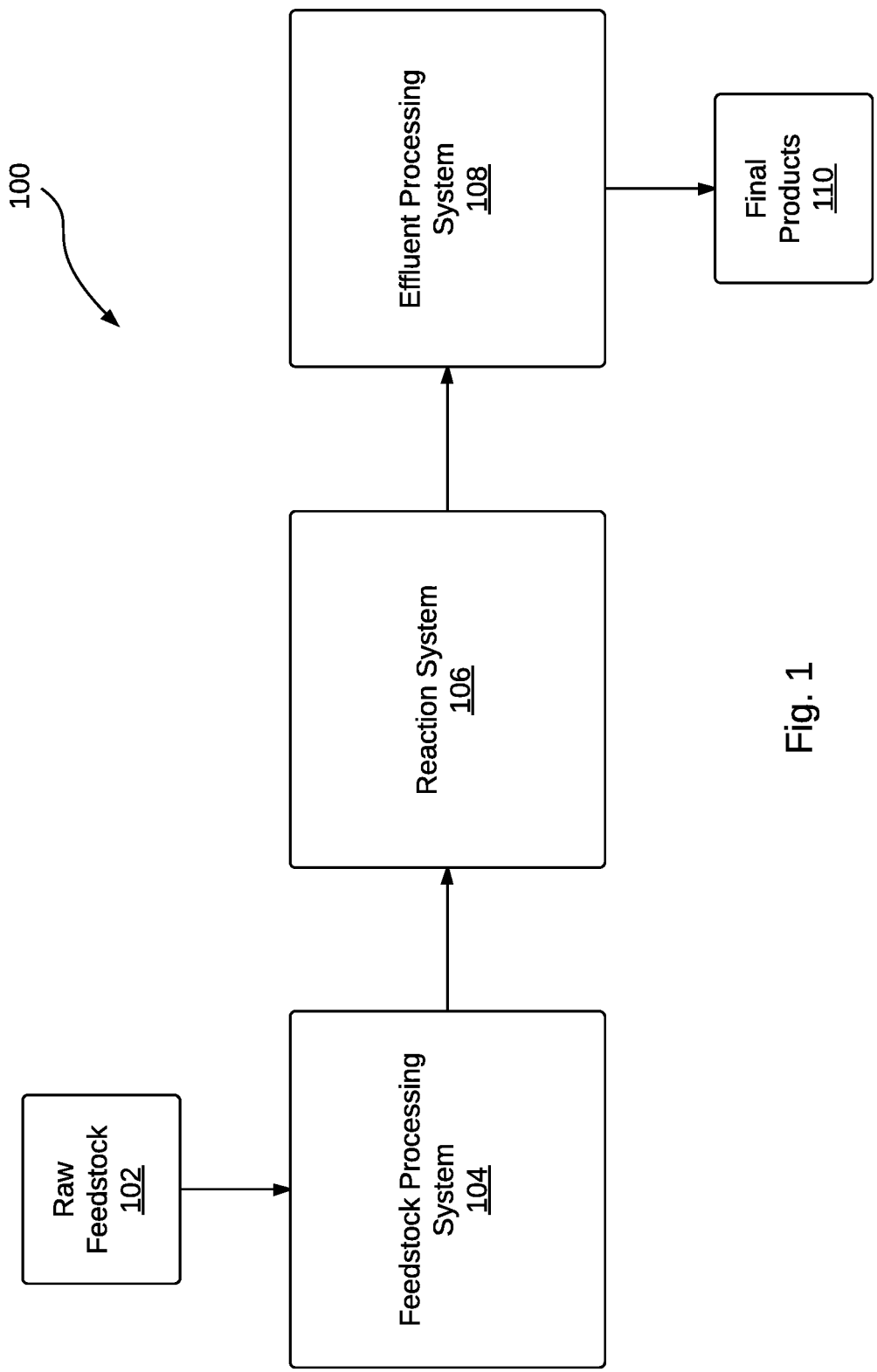
FIG. 1 is a block diagram of one embodiment of a process for oxidizing an organic feedstock that includes a feedstock processing system, a reaction system, and an effluent processing system.

Referring to FIG. 1, a block diagram of an improved aqueous phase oxidation process 100 is shown. The process 100 includes a feedstock processing system 104, a reaction system 106, and an effluent processing system 108. The process is conceptually divided into the three systems 104, 106, 108 only for the purpose of describing it. It should be appreciated that the dividing line between each system 104, 106, 108 is somewhat arbitrary and does not represent a hard and fast boundary. Indeed, various components of one system could just as easily be considered part of a different system. With this in mind, the three systems 104, 106, 108 should be viewed as a convenient conceptual framework from which to describe the overall operation of the process.

The raw feedstock 102 enters the feedstock processing system 104 where it is modified and/or processed to produce a primary feedstock. The primary feedstock is fed to the reaction system 106 where it is oxidized. The effluent from the reaction system 106 enters the effluent processing system 108 where it is separated and/or otherwise processed to produce final products 110. Each system 104, 106, 108 is described in greater detail.

The raw feedstock 102 can be any suitable material capable of being oxidized. In one embodiment, the raw feedstock 102 is an organic feedstock that includes organic material such as that found in sewage material, farm waste, municipal waste, food processing waste (e.g., potato skins), and the like.

The organic feedstock can include any amount of organic material. For example, the organic feedstock can include, on a dry basis, at least approximately 20 wt % organic material, at least approximately 50 wt % organic material, at least approximately 75 wt % organic material, at least approximately 80 wt % organic material, at least approximately 90 wt % organic material, or at least approximately 95 wt % organic material. The organic feedstock can include, on a dry basis, approximately 20 wt % to approximately 100 wt % organic material.

The raw feedstock 102 can also include any suitable amount of solids. It is generally preferable for the raw feedstock 102 to include enough liquid to make it possible to pump the raw feedstock 102 through the system. However, it should be appreciated that the rheological properties of the feedstock 102 can be adjusted as desired by adding or removing water or acids.

In one embodiment, the raw feedstock 102 includes approximately 1 to 95 wt % solids, approximately 1 to 50 wt % solids, or approximately 2 to 30 wt % solids. The raw feedstock 102 can include at least 1 wt % solids, at least 2 wt % solids, or at least 3 wt % solids. The raw feedstock 102 can include no more than 95 wt % solids, no more than 50 wt % solids, or no more than 30 wt % solids.

Sewage material is one of the most common forms of raw feedstock 102 oxidized in the process. The rest of the description refers to the raw feedstock 102 as sewage material 102 to reflect this. It should be appreciated, however, that virtually any raw feedstock, particularly those that contain organic material, can be the raw feedstock 102.

The sewage material 102 can be supplied in any of a number of different forms. For example, it can be supplied as a slurry or bulk solids. In one embodiment, the sewage material is supplied as a readily pourable liquid that includes approximately 2 to 20 wt % solids, approximately 3 to 10 wt % solids, or, desirably, 4 to 6 wt % solids (e.g., approximately 5 wt % solids). The solids are largely if not entirely organic materials with the exception of trace minerals and heavy metals that may be present.

Figure 2:
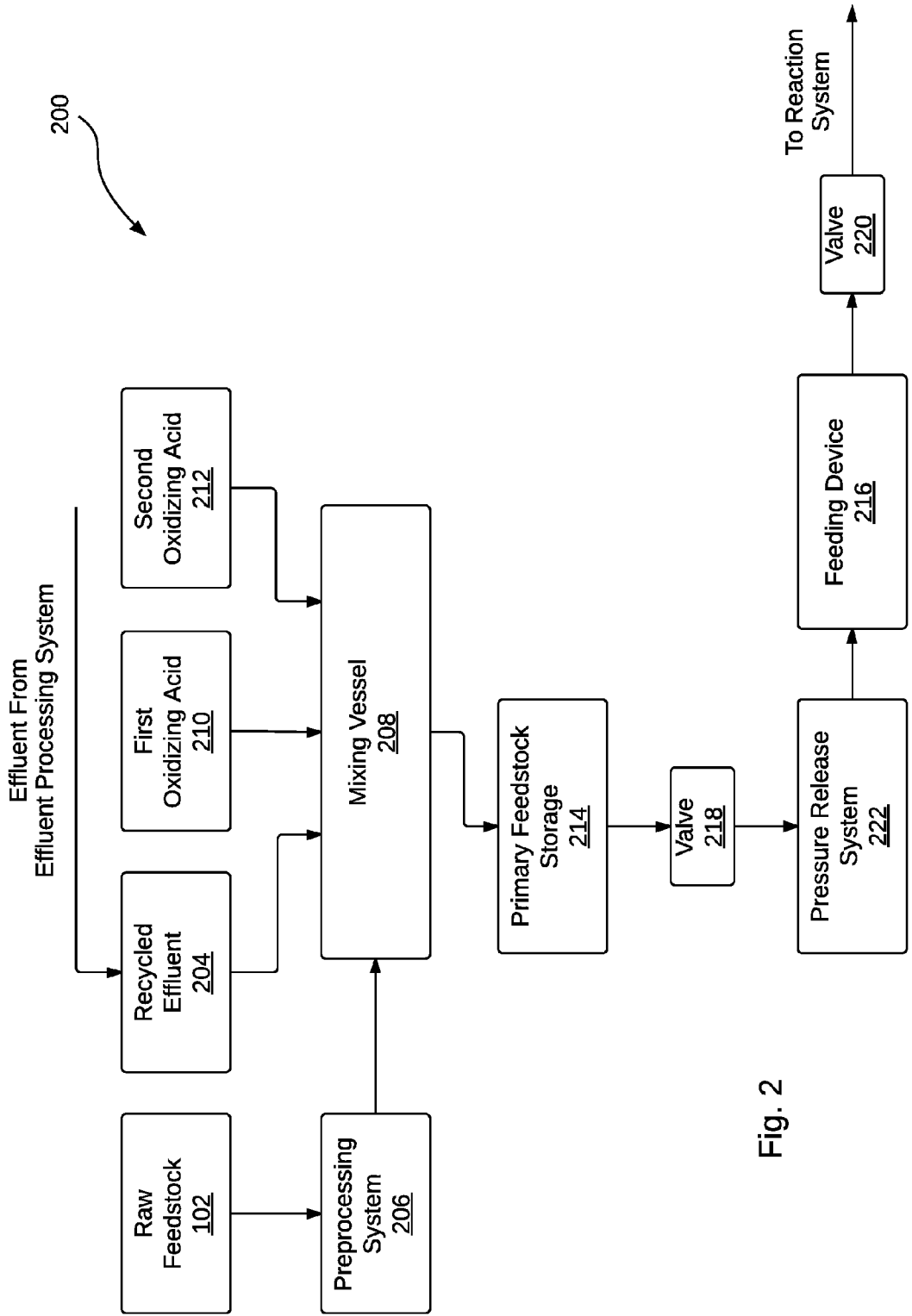
FIG. 2 is a block diagram of one embodiment of the feedstock processing system in FIG. 1.

FIG. 2 shows a block diagram of one embodiment of a feedstock processing system 200. The sewage material 102 initially enters a preprocessing system 206 where the physical characteristics of the sewage material 102 are altered to make the sewage material 102 easier to oxidize.

In one embodiment, the sewage material 102 is dewatered in the preprocessing system 206 to produce a dewatered feedstock. Dewatering refers broadly to any process that reduces the water content of the sewage material 102. There are numerous ways that the sewage material 102 can be dewatered.

In one embodiment, the sewage material 102 is dewatered by mixing a flocculant with the sewage material 102 causing the solids to clump together. The solids can then be separated using any suitable separation device or technique. In another embodiment, the sewage material 102 is dewatered without the use of a flocculant.

Additional examples of suitable techniques and devices for dewatering the sewage material 102 include evaporation in a lagoon or sand drying bed or mechanical separation using a rotary drum vacuum filter, centrifuge, belt filter press, plate and frame press, or vacuum dewatering bed.

In another embodiment, the sewage material 102 is ground, cut, or otherwise comminuted in the preprocessing system 206 to reduce the size of the solid particles, improve the uniformity of the feedstock, and/or make the feedstock more amenable to evenly controlled pumping. For example, the preprocessing system 206 can include one or more grinders, cutters, choppers, and the like which grind, cut, and chop the sewage material 102 until it reaches the desired consistency.

In one embodiment, the sewage material 102 passes through a cutter and a grinder positioned in series. The sewage material 102 is pumped as a batch into a tank where it is circulated through a cutter until the solids reach a uniform size. The sewage material 102 is pumped as a batch into another tank where it is circulated through a grinder that further reduces the particle size of the solids. The sewage material 102 is then pumped into another tank where it is stored for further processing.

It is often desirable to control the size and uniformity of the sewage material 102 for a number of reasons. A uniform feedstock is easier to feed into the reactor 402, which is often operated at an elevated pressure, without plugging the entry opening. Also, a uniform feedstock makes it easier to control the reaction rate in the reactor 402.

Larger particles generally need longer residence times and/or more acid to sufficiently react. If the feedstock contains both large and small particles, the large particles tend to dictate the residence time. Thus, it is desirable to create a feedstock that generally has small, uniform particles. This is especially true when the feedstock includes organic matter such as that contained in the sewage material 102.

A feedstock with small uniform, particles reacts faster than a feedstock with a wide distribution of particle sizes. Increasing the reaction rate can also make it possible to reduce the size of the reactor 402 and/or increase the feed rate of the feedstock into the reactor 402. Either adjustment has a beneficial effect on the economics of the process 100.

In one embodiment, the largest dimension of at least approximately 95% of the particles in the comminuted feedstock is no more than approximately 7 mm, no more than approximately 4 mm, no more than approximately 2.5 mm, desirably, no more than approximately 1.5 mm, or, suitably, no more than approximately 0.5 mm. In another embodiment, the largest dimension of at least approximately 98% of the particles in the comminuted feedstock is no more than approximately 7 mm, no more than approximately 4 mm, no more than approximately 2.5 mm, desirably, no more than approximately 1.5 mm, or, suitably, no more than approximately 0.5 mm. In yet another embodiment, the largest dimension of at least substantially all of the particles in the comminuted feedstock is no more than approximately 7 mm, no more than approximately 4 mm, no more than approximately 2.5 mm, desirably, no more than approximately 1.5 mm, or, suitably, no more than approximately 0.5 mm.

It should be appreciated that the sewage material 102 can be comminuted at other locations in the feed processing system 200 besides the preprocessing system 206. For example, the sewage material 102 can be comminuted in the mixing vessel 208 as part of the process of mixing the various materials together. The sewage material 102 can also be comminuted in a separate vessel or grinder before entering the mixing vessel 208. Numerous variations are possible.

It should be appreciated that it is not required to preprocess the sewage material 102. In some embodiments, such as the one shown in FIG. 3, the sewage material 102 may not undergo preprocessing 206.

The preprocessed feedstock is mixed with recycled effluent 204, a first oxidizing acid 210, and, optionally, a second oxidizing acid 212 in the mixing vessel 208 to produce a primary feedstock. The amount of recycled effluent 204 and/or oxidizing acids 210, 212 added to the mixing vessel 208 should be sufficient to create a slurry that doesn't plug or clog the equipment and/or facilitates later processing and transport.

The amount of recycled effluent 204 added can vary depending on the characteristics of the sewage material 102. Generally, larger quantities of the recycled effluent 204 are used if the sewage material 102 is dry, while smaller quantities, or possibly none at all, are used if the sewage material 102 already includes a suitable amount of liquid. In one embodiment, the weight ratio of the recycled effluent 204 to the sewage material 102 in the mixing vessel 208 is approximately 1.5 to 4 or, desirably, approximately 2 to 3.

The recycled effluent 204 can be supplied at an elevated temperature to heat the sewage material 102 when the two are mixed together. The effluent from the reactor 402 (FIG. 4) is heated by the exothermic oxidation of the sewage material 102 and/or by a heater that is part of the reactor 402. The recycled effluent 204 can be at an elevated temperature simply because it has not cooled (either naturally or due to active cooling) after leaving the reactor 402. The recycled effluent 204 can also be heated in a heat exchanger to keep it at an elevated temperature.

In one example, described in greater detail below, the recycled effluent 204 and/or the primary feedstock is heated in a heat exchanger using heat from the effluent that has just left the reactor 402. The recycled effluent 204 can be stored in an insulated tank or vessel before being mixed with the sewage material 102 to maintain it at an elevated temperature. The resulting feedstock can be significantly above ambient temperature. In one embodiment, the recycled effluent 204 is supplied at a temperature of approximately 40° C. to 90° C. or, desirably, 50° C. to 75° C. The primary feedstock can be approximately 37° C. to 50° C.

The recycled effluent 204 and the acids 210, 212 are added to the preprocessed feedstock before it enters the reactor 402. The amount of recycled effluent 204 added is just enough to lower the viscosity of the preprocessed feedstock to allow it to be fed into the reactor 402. It has been found that pre-treating the preprocessed feedstock in this manner may increase the reaction rate in the reactor 402. The primary feedstock is preferably fed into the reactor 402 immediately after the recycled effluent 204 and the acids 210, 212 have been added. It should be appreciated that the preprocessed feedstock can also be fed into the reactor without mixing it with the recycled effluent 204 and/or the acids 210, 212.

The first oxidizing acid 210 and the second oxidizing acid 212 are added to the mixing vessel 208 until the concentration of the acids 210, 212 in the primary feedstock, excluding solids (i.e., the concentration of the primary feedstock excluding the solids portion), is approximately the same as the concentration of the acids 210, 212, respectively, in the reactor 402 at start-up. In one embodiment, the acids 210, 212 are added until the pH of the primary feedstock is about 1.0. The feedstock is about neutral and the pH of the recycled effluent 204 is about 1.3 so enough acids 210, 212 are added to reach a final pH for the primary feedstock of about 1.0

The first oxidizing acid 210 can be sulfuric acid, and the second oxidizing acid 212 can be nitric acid. The acids function as the oxidizing agent to oxidize the sewage material 102. In general, it is preferable to use more sulfuric acid than nitric acid. Sulfuric acid is a less aggressive oxidizing agent so it is less likely to excessively react with the sewage material 102 and produce low value products. For example, a higher amount of sulfuric acid relative to nitric acid produces longer chain hydrocarbons and other valuable organic products, while a higher amount of nitric acid relative to sulfuric acid aggressively oxidizes the sewage material to low value products such as carbon dioxide, water, nitrogen gas, etc. Sulfuric acid is also less expensive than nitric acid.

Any suitable amount of the first oxidizing acid can be used. In one embodiment, the first oxidizing acid is added to achieve a concentration in the primary feedstock, excluding solids, of at least approximately 0.5 wt %, desirably, at least approximately 1 wt %, or, suitably, at least approximately 1.5 wt %. In another embodiment, the first oxidizing acid is added to achieve a concentration in the primary feedstock, excluding solids, of no more than approximately 5 wt %, desirably, no more than approximately 3.5 wt %, or, suitably, no more than approximately 3 wt %. In yet another embodiment, the first oxidizing acid is added to achieve a concentration in the primary feedstock, excluding solids, of approximately 0.5 wt % to 5 wt %, desirably, approximately 1 wt % to 3.5 wt %, or, suitably, approximately 1.5 wt % to 3 wt %.

On a molar basis, in one embodiment, the first oxidizing acid is added to achieve a concentration in the primary feedstock, excluding solids, of at least approximately 0.052 mol/L, desirably, at least approximately 0.10 mol/L, or, suitably, at least approximately 0.16 mol/L. In another embodiment, the first oxidizing acid is added to achieve a concentration in the primary feedstock, excluding solids, of no more than approximately 0.52 mol/L, desirably, no more than approximately 0.36 mol/L, or, suitably, no more than approximately 0.31 mol/L. In yet another embodiment, the first oxidizing acid is added to achieve a concentration in the primary feedstock, excluding solids, of approximately 0.052 mol/L to 0.52 mol/L, desirably, approximately 0.10 mol/L to 0.36 mol/L, or, suitably, approximately 0.16 mol/L to 0.31 mol/L.

The weight ratio of solids in the primary feedstock to the first oxidizing acid can be at least approximately 0.3, at least approximately 0.5, at least approximately 0.7, at least approximately 1, at least approximately 1.5, or at least approximately 2. The weight ratio of solids in the primary feedstock to the first oxidizing acid can also be approximately 0.3 to approximately 30, approximately 0.5 to approximately 25, approximately 0.7 to approximately 20, approximately 1 to approximately 15, approximately 1.5 to approximately 10, or approximately 2 to approximately 7.5. The weight ratio of solids in the primary feedstock to the first oxidizing acid can be no more than approximately 30, no more than approximately 25, no more than approximately 20, no more than approximately 15, no more than approximately 10, or no more than approximately 7.5. The weight ratio of solids in the primary feedstock to the first oxidizing acid can be the same as the weight ratio of organic material in the primary feedstock (regardless whether the organic material is solid) to the first oxidizing acid.

Any suitable amount of second oxidizing acid can be used. In one embodiment, the second oxidizing acid is added to achieve a concentration in the primary feedstock, excluding solids, of at least approximately 0.05 wt %, desirably, at least approximately 0.1 wt %, at least approximately 0.5 wt % or at least approximately 1 wt %. In another embodiment, the second oxidizing acid is added to achieve a concentration in the primary feedstock, excluding solids, of no more than approximately 5 wt %, desirably, no more than approximately 3 wt %, no more than approximately 2 wt %, or, suitably, no more than approximately 1 wt %. In yet another embodiment, the second oxidizing acid may be added to achieve a concentration in the primary feedstock, excluding solids, of approximately 0.05 wt % to 5 wt %, desirably, approximately 0.1 wt % to 3 wt %, or, suitably, approximately 0.5 wt % to 2 wt %.

On a molar basis, in one embodiment, the second oxidizing acid is be added to achieve a concentration in the primary feedstock, excluding solids, of at least approximately 0.008 mol/L, at least approximately 0.016 mol/L, at least approximately 0.08 mol/L, or at least approximately 0.16 mol/L. In another embodiment, the second oxidizing acid may be added to achieve a concentration in the primary feedstock, excluding solids, of no more than approximately 0.80 mol/L, desirably, no more than approximately 0.48 mol/L, no more than approximately 0.32 mol/L, or, suitably, no more than approximately 0.0.16 mol/L. In yet another embodiment, the second oxidizing acid may be added to achieve a concentration in the primary feedstock, excluding solids, of approximately 0.008 mol/L to 0.80 mol/L, desirably, approximately 0.016 mol/L to 0.48 mol/L, or, suitably, approximately 0.08 mol/L to 0.32 mol/L.

The weight ratio of solids in the primary feedstock to the second oxidizing acid can be at least approximately 0.5, at least approximately 0.75, at least approximately 1, at least approximately 2, at least approximately 5, or at least approximately 7. The weight ratio of solids in the primary feedstock to the second oxidizing acid can also be approximately 0.5 to approximately 50, approximately 0.75 to approximately 45, approximately 1 to approximately 40, approximately 2 to approximately 35, approximately 5 to approximately 30, or approximately 7 to approximately 25. The weight ratio of solids in the primary feedstock to the second oxidizing acid can be no more than approximately 50, no more than approximately 45, no more than approximately 40, no more than approximately 35, no more than approximately 30, or no more than approximately 25. The weight ratio of solids in the primary feedstock to the second oxidizing acid can be the same as the weight ratio of organic material in the primary feedstock (regardless whether the organic material is solid) to the second oxidizing acid.

The total amount of oxidizing acid in the primary feedstock can vary widely. In one embodiment, the total amount of acid in the primary feedstock, excluding solids, is at least approximately 0.3 wt %, desirably, at least approximately 0.5 wt %, or, suitably, at least approximately 1 wt %. In another embodiment, the total amount of acid in the primary feedstock, excluding solids, is no more than approximately 7.5 wt %, desirably, no more than approximately 5 wt %, no more than approximately 3 wt %, or, suitably, no more than approximately 2 wt %. In yet another embodiment, the total amount of acid in the primary feedstock, excluding solids, is approximately 0.3 wt % to 7.5 wt %, desirably, approximately 0.5 wt % to 5 wt %, or, suitably, approximately 1 wt % to 3 wt %.

Any ratio of the first oxidizing acid the second oxidizing acid can be used. In one embodiment, the ratio of first oxidizing acid to second oxidizing acid in the primary feedstock is at least approximately 0.5, at least approximately 1, at least approximately 2, desirably, at least approximately 3, or, suitably, at least approximately 4. In another embodiment, the second oxidizing acid may be eliminated entirely or additional acids may be added. For example, the process may be operated using only the first oxidizing acid.

The weight ratio of solids in the primary feedstock to the total amount of oxidizing acid can be at least approximately 0.2, at least approximately 0.5, at least approximately 0.75, at least approximately 1, or at least approximately 1.5. The weight ratio of solids in the primary feedstock to the total amount of oxidizing acid can also be approximately 0.2 to approximately 20, approximately 0.5 to approximately 15, approximately 0.75 to approximately 10, approximately 1 to approximately 7.5, or approximately 1.5 to approximately 5. The weight ratio of solids in the primary feedstock to the total amount of oxidizing acid can be no more than approximately 20, no more than approximately 15, no more than approximately 10, no more than approximately 7.5, or no more than approximately 5. The weight ratio of solids in the primary feedstock to the total amount of oxidizing acid can be the same as the weight ratio of organic material in the primary feedstock (regardless whether the organic material is solid) to the total amount of oxidizing acid.

The primary feedstock can have any suitable pH. In one embodiment, the pH of the primary feedstock is at least approximately 0.5, desirably, at least approximately 0.7, or, suitably, at least approximately 0.85. In another embodiment, the pH of the primary feedstock is no more than approximately 1.75, desirably, no more than approximately 1.5, or, suitably, no more than approximately 1.25. In another embodiment, the pH of the primary feedstock is approximately 0.5 to 1.75, desirably, approximately 0.7 to 1.5, or, suitably, approximately 0.85 to 1.25.

The mixing vessel 208 can be any suitable tank, pipe, or other vessel that is capable of holding and/or mixing the materials. The mixing vessel 208 should be made of a material that is chemically resistant to the acids 210, 212. Suitable materials include plastic, titanium, stainless steel, zirconium, and the like. In one embodiment, the mixing vessel 208 is a plastic lined steel vessel (e.g., carbon steel or stainless steel lined with polytetrafluoroethylene (PTFE), polyfluoroalkoxy (PFA), or other fluoropolymers). In another embodiment, the reactor 402 can be made of G-35 stainless steel, or Zirconium 702.

As shown in FIG. 2, the primary feedstock exits the mixing vessel 208 and is stored in a storage vessel or tank 214 before it is fed into the reactor 402. In one embodiment, the storage vessel 214 is insulated to maintain the temperature of the primary feedstock and conserve energy. It should be noted that it is generally not desirable to store the primary feedstock for a long period of time before feeding it into the reactor 402. The presence of the acids 210, 212 may cause the primary feedstock to separate and the texture to change in a way that can make it difficult to feed into the reactor 402.

The primary feedstock is now prepared to be fed into the reactor 402. This can be accomplished using a variety of different techniques and equipment. In one embodiment, the primary feedstock is fed into the reactor 402 by one or more feeding devices 216.

The feeding device 216 feeds the primary feedstock into the reactor 402 at a steady rate or approximately steady rate. Relatively minor fluctuations in the feed rate can cause large fluctuations in the reaction under certain situations such as the conditions present during batch reactions. If the feed rate drops, the reactor 402 is starved and if the feed rate climbs, the reactor 402 is overfed.

The reaction may be, in some situations, more sensitive to feed rate fluctuations than to other parameters such as temperature and pressure. For this reason, it is desirable to tightly control the feed rate. However, this is not a simple matter since the reactor 402 can experience relatively large fluctuations in pressure and temperature. The pressure swings make it particularly difficult to feed the primary feedstock into the reactor 402 at a steady rate.

The feeding device 216 can have any suitable configuration that allows it to feed the primary feedstock at a steady rate. In one embodiment, the feeding device 216 is actuated or powered hydraulically or pneumatically. For example, the feeding device 216 may include one or more hydraulic or pneumatic rams that dispense or force the primary feedstock into the reactor 402. One example of a suitable hydraulically powered feeding device is a cycling ram pump.

The feeding device 216 can also be actuated or powered by a gearmotor. For example, the feeding device 216 includes a gearmotor that turns a screw which, in turn, feeds the primary feedstock into the reactor 402. The feeding device 216 can be configured so that pressure fluctuations in the reactor 402, even up to the reactor's safe operating pressure limit of approximately 13,800 kPa, do not significantly change the feed rate.

In one embodiment, the feeding device 216 is an extruder and/or injector that is hydraulically, pneumatically, or gear actuated. Multiple feeding devices 216 can be positioned in parallel to provide an uninterrupted supply of the primary feedstock to the reactor 402. The multiple feeding devices 216 can be sequentially activated and refilled so that when one feeding device 216 is injecting the feedstock into the reactor 402, another feeding device 216 is refilled with the primary feedstock. Also, the use of multiple feeding devices 216 is advantageous because it allows one or more devices 216 to be offline for maintenance or repairs while the remainder of the devices 216 provide a continuous supply of feedstock to the reactor 402.

The feeding device 216 can feed the primary feedstock into the reactor at a rate that fluctuates no more than approximately 10% per hour, desirably, no more than approximately 5% per hour, or, suitably no more than approximately 2% per hour. In another embodiment, the feeding device 216 feeds the primary feedstock into the reactor at a feed rate that is approximately constant. The feeding device 216 is capable of maintaining the desired feed rate even though the pressure in the reactor 402 can vary from approximately 1,035 kPa to 6,900 kPa.

The operation of the feeding device 216 is as follows. The feeding device 216 is initially at atmospheric pressure when it is filled with the primary feedstock from the storage vessel 214. The feeding device 216 is isolated from the high pressure in the reactor 402 by a valve 220. Once the feeding device 216 is full of primary feedstock, a valve 218 is closed to isolate the feeding device 216 from the low pressure environment of the primary feedstock storage 214. The valve 220 is opened and the feeding device 216 injects the primary feedstock into the reactor 402.

In this manner, the feeding device 216 can be selectively exposed to atmospheric pressure when it is filled with the primary feedstock and exposed to the high pressure of the reactor 402 when it is feeding the primary feedstock into the reactor 402. The valves 218, 220 selectively isolate the feeding device 216 from the reactor 402 during feeding and refilling operations. As explained above, the valve 218 is closed and the valve 220 is open when the feeding device 216 injects the primary feedstock into the reactor 402, and the valve 220 is closed and the valve 218 is open when the feeding device 216 is refilled with the primary feedstock.

The valves 218, 220 may also be used to isolate the feeding device 216 so that it can be repaired while the reactor 402 remains in operation. Moreover, the valves 218, 220 can also prevent backflow from the reactor 402 into the feedstock processing system 104 during an overpressure event. It should be appreciated that although the valves 218, 220 are depicted as being separate from the feeding device 216, the valves 218, 220 may be provided as integral components of the feeding device 216.

A pressure release system 222 may be provided that allows the feeding device 216 to transition from a high pressure state to a low pressure state without causing undue wear on the components and/or blowback into the primary feedstock storage 214 when the valve 218 is opened. In one embodiment, the pressure release system may include a tank that is capable of absorbing excess pressure.

In another embodiment, the feeding device 216 feeds the primary feedstock into the reactor 402 at a rate that is not steady, but fluctuates somewhat. For example, a single feeding device 216 can be used that is repeatedly refilled and activated. The reactor 402 only receives feedstock when the feeding device 216 is activated so that no feedstock enters the reactor 402 while the feeding device 216 is refilled. The refill time can be relatively short compared to the activation time to minimize the effect on the reaction.

Figure 3:
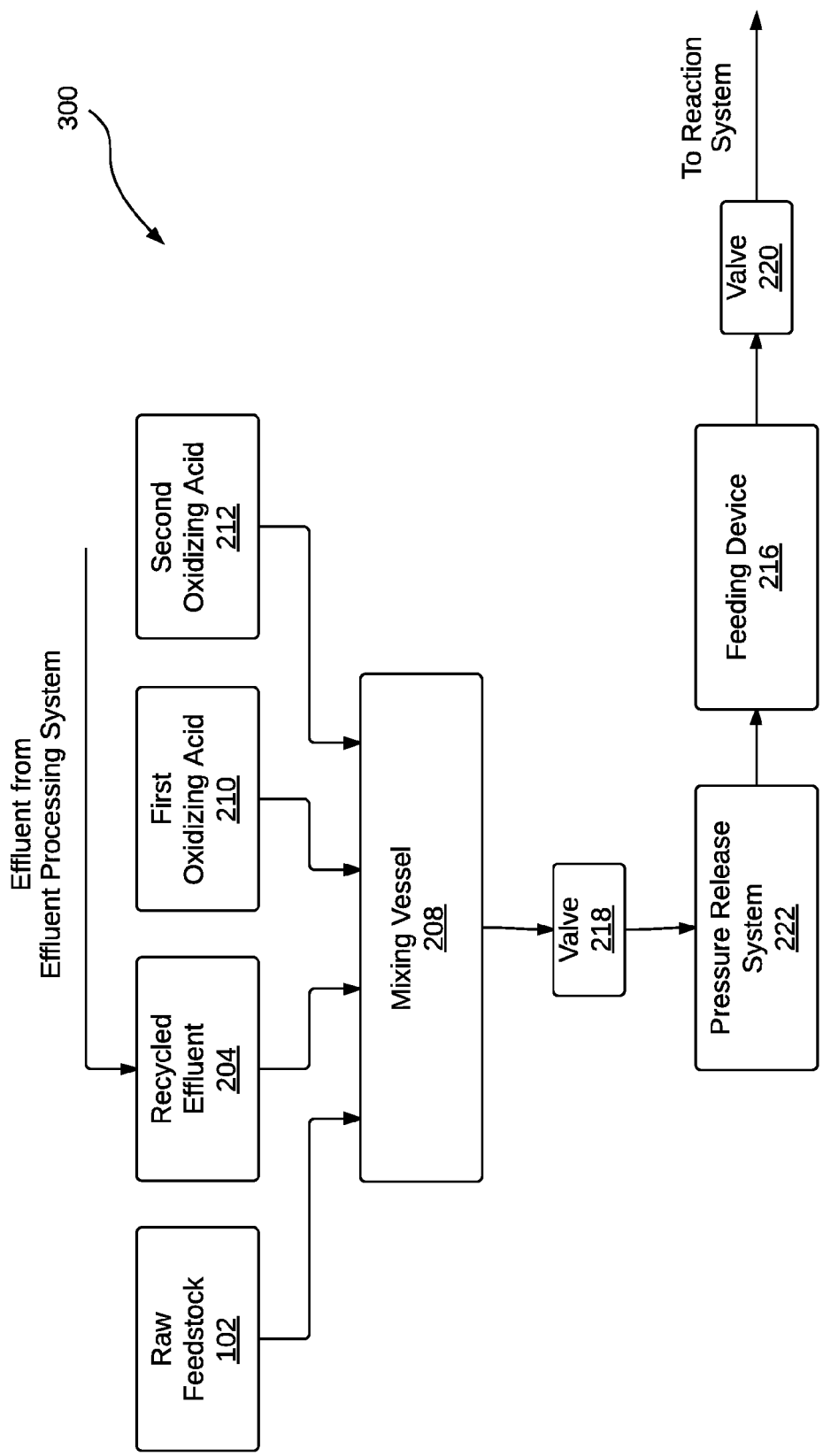
FIG. 3 is a block diagram of another embodiment of the feedstock processing system in FIG. 1.

It should be appreciated that the feedstock processing system 104 can be configured in a number of other ways besides that shown in FIG. 2. For example, FIG. 3 shows a block diagram of another embodiment of a feedstock processing system 300. This embodiment is similar to the feedstock processing system 200 except that the sewage material 102 is not preprocessed before entering the mixing vessel 208. Also, the primary feedstock is not stored in a separate storage vessel.

The feedstock processing system 300 can be used in a variety of situations such as where the sewage material 102 is sewage sludge or a bulk solid material. Also, the mixing vessel 208 can function as a storage vessel so that the primary feedstock is drawn from the mixing vessel 208 into the reactor 402. Numerous other changes to the feedstock processing system 104 are also contemplated.

Figure 4:
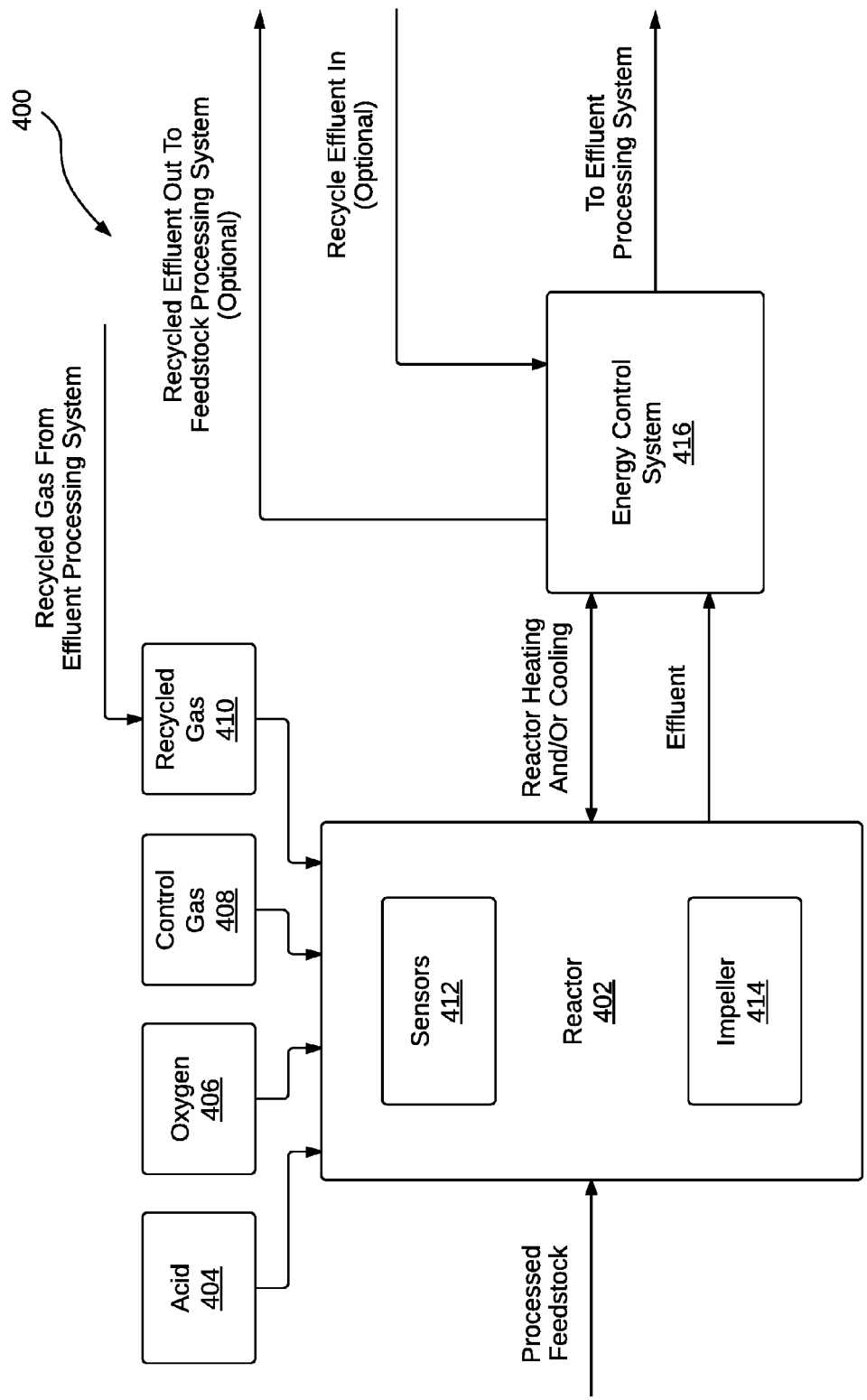
FIG. 4 is a block diagram of one embodiment of the reaction system in FIG. 1.

Referring to FIG. 4, a block diagram is shown of one embodiment of a reaction system 400. The reaction system 400 includes the reactor 402, which receives the processed feedstock from the feedstock processing system 104. The reactor 402 is in fluid communication with an additional acid source, an oxygen gas source 406, a control gas source 408, and, optionally, a recycled gas source 410. The reactor 402 includes one or more sensors 412 and an impeller or dispersion device 414. The temperature of the reactor 402 is controlled by an energy control system 416.

The reactor 402 can have any suitable configuration and be made of any suitable material. The reactor 402 can be a tank, pipe or tubular reactor. In one embodiment, the reactor 402 is a pipe or tubular reactor that contains a static mixer to facilitate mixing. In another embodiment, the reactor 402 is a pipe that repeatedly changes directions to facilitate mixing. The reactor 402 can be a batch reactor, plug flow reactor, or continuous stirred-tank reactor. The reactor 402 can be any suitable size that is capable of accommodating the desired throughput.

The reactor 402 should be made of a material that is chemically resistant to the acids 210, 212 and capable of withstanding high pressures. Suitable materials include plastic, titanium alloys, stainless steel, zirconium, and the like. In one embodiment, the reactor 402 may be a plastic lined steel vessel (e.g., carbon steel or stainless steel lined with polytetrafluoroethylene (PTFE), polyfluoroalkoxy (PFA), or other fluoropolymers). In another embodiment, the reactor 402 can be made of G-35 stainless steel, or Zirconium 702.

At start-up, the reactor 402 is initially charged with an initial reaction mixture that includes an aqueous solution of the first oxidizing acid and the second oxidizing acid. In one embodiment, the first oxidizing acid is sulfuric acid and the second oxidizing acid is nitric acid. The reactor 402 can be initially charged with an aqueous mixture of sulfuric and nitric acid having any of the concentrations described above.

In one embodiment, the reactor is a tank reactor. The reactor 402 can be filled to any suitable level with the initial reaction mixture. In one embodiment, the initial reaction mixture occupies at least approximately 25% of the volume of the reactor 402 or, suitably, at least approximately 35% of the volume of the reactor 402. In another embodiment, the initial reaction mixture occupies no more than approximately 80% of the volume of the reactor 402 or, suitably, no more than approximately 70% of the volume of the reactor 402. In yet another embodiment, the initial reaction mixture occupies approximately 25% to 80% of the volume of the reactor 402 or, suitably, approximately 35% to 70% of the volume of the reactor 402. Preferably, the initial reaction mixture occupies approximately 50% of the volume of the reactor 402. In any of these embodiments, the remainder of the volume of the reactor 402, i.e., the headspace, is occupied by gases.

The headspace is initially charged with oxygen gas and/or one or more other gases, preferably inert gases. The oxygen gas facilitates oxidation of the feedstock and/or regeneration of the nitric acid in the reaction mixture as described in greater detail below. The oxygen gas 406 may be supplied from any suitable source. For example, the oxygen source can come from air, pure or substantially pure oxygen gas, or even the product of another reaction.

In one embodiment, the amount of oxygen gas in the headspace at start-up is at least approximately 2 volume percent, desirably, at least approximately 5 volume percent, or, suitably, at least approximately 8 volume percent. In another embodiment, the amount of oxygen gas in the headspace at start-up is no more than approximately 80 volume percent, desirably, no more than approximately 60 volume percent, or, suitably, no more than approximately 55 volume percent. In yet another embodiment, the amount of oxygen gas in the headspace at start-up is approximately 2 to 80 volume percent, desirably, 5 to 60 volume percent, or, suitably, 8 to 55 volume percent.

The headspace can also be charged with other gases that are inert or otherwise unable to adversely affect the redox reaction. Suitable gases include nitrogen, argon, and the like. In one embodiment, the headspace is charged with air, which includes a mixture of nitrogen, oxygen, and other gases. These gases are supplied as the control gas 408 in FIG. 4.

At start-up, the temperature and pressure are increased together until operating conditions are reached. For example, when the temperature reaches 60° C., the pressure is increased by adding gas to the headspace until it is approximately 1035 kPa. At 150° C., the pressure is increased to approximately 2070 kPa. Once the mixture reaches operating temperature, the pressure is increased to approximately 3450 kPa. It should be appreciated, that the temperature and pressure may fluctuate substantially from the initial levels during operation.

The initial reaction mixture is heated by the energy control system 416 to at least 150° C. as the impeller 414 vigorously mixes or agitates the reaction mixture. The energy control system 416 includes one or more heat exchangers positioned inside and/or outside the reactor 402. It should be appreciated that the redox reaction is exothermic and contributes heat to the reactor 402. The energy control system 416 can be used to heat or cool the reactor 402 and the reaction mixture inside depending on the circumstances. It should be appreciated that the same heat exchanger can be used to heat or cool the reactor 402 as desired or multiple heat exchangers can be used.

It should be appreciated that the energy control system 416 can be viewed as a collection of any number, type, or configuration of heat exchangers, heat sources, heat sinks and other energy transfer devices and components that add and/or extract heat from various streams, reactors, etc. For example, the energy control system 416 may include a supplemental heat source that is used to supply and/or remove heat from the heat exchanger using one or more heat exchange coils.

The gas in the headspace of the reactor may be dispersed into the reaction mixture. This prevents oxygen gas from accumulating in the headspace. In one embodiment, this is accomplished using an impeller that propels the gas from the headspace into the reaction mixture as the impeller rotates. The result is that the composition of the gas in the reaction mixture is close to or the same as the composition of the gas in the headspace. In particular, the concentration of oxygen gas in the dissolved and entrained gas portion of the reaction mixture is similar, if not the same, as the concentration of oxygen gas in the headspace. The reaction mixture may be mixed vigorously to increase the total amount of oxygen gas in the mixture.

The impeller 414 is used to thoroughly and vigorously mix the reaction mixture and disperse the gas from the headspace into the reaction mixture. The impeller 414 can have any suitable design or configuration so long as it is capable of adequately mixing the gas in the headspace with the reaction mixture. In one embodiment, the impeller 414 includes two sets of blades. One set of blades is located at the bottom of the impeller 414, which is near the bottom of the reactor 402. These blades are positioned just above the sparger through which oxygen gas is injected into the reactor 402. The blades shear the oxygen gas to better mix it into the liquid. Another set of blades is positioned at the top of the reaction mixture. This set of blades propels the gas in the headspace into the reaction mixture. Both sets of blades are attached to a single shaft.

In another embodiment, the impeller 414 is a gas entrainment impeller. The gas is dispersed by impeller blades attached to a hollow shaft through which gases are continuously recirculated from the headspace of the reactor 402. The gas enters openings near the top of the shaft and is expelled through dispersion ports located at the tips of the impeller blades. The high speed rotation of the impeller blades creates a low pressure area at the tip. The pressure at the tip of the blades drops as the speed of the impeller 414 increases, thereby increasing the rate at which gas is dispersed from the headspace through the reaction mixture.

The reactor 402 can also include one or more baffles that enhance dispersion of the headspace gas as well as the general stirring of the reaction mixture. The transfer of gas is governed by the relative speed of the tips of the impeller 414 to the liquid phase, which reduces the pressure at the tips (i.e., creates a vacuum) of the impeller 414 and thereby draws gas into the reaction mixture. A baffle may be used to impede rotation of the liquid reaction mixture relative to the impeller 414. This may enhance the operation of the impeller 414. A baffle designed specifically for this purpose may be placed in the reactor 402. Alternatively, a cooling/heating coil and/or other structures that are integral or added to the reactor 402 may function as a baffle. In one embodiment, the cooling/heating coil has a serpentine shape.

The sensors 412 are used to measure one or more of the following parameters: temperature, pressure, or liquid level. The sensors 412 can be used to implement an automated control system or simply provide the operator with information about the status of the reactor 402.

The reactor 402 may include an emergency blowdown system. In one embodiment, the emergency blowdown system includes a large-diameter, high pressure pipe that runs from the reactor 402 to an emergency blowdown containment vessel. In the event of an emergency overheat/overpressure situation, the pipe will quickly empty the reactor 402 into the emergency blowdown containment vessel. The vessel is sized to receive all the contents of the reactor 402 without any leaking into the surrounding environment.

The pressure and/or concentration of the gas in the headspace of the reactor 402 can be adjusted by releasing gas from the headspace. The gas can be released through a gas out port on the reactor 402. A significant amount of the gas exits the reactor 402 through the effluent. In one embodiment, the ratio of gas that exits through the effluent to gas that exits in other ways is approximately 0.5 to 1.5.

Once the reactor 402 reaches its operating temperature and pressure, it is ready to receive and oxidize the primary feedstock. The primary feedstock is fed into the reactor 402 and shortly thereafter the redox reaction reaches a steady operating state. At this point, the reaction mixture includes the primary feedstock, the initial start-up oxidizing acids, water, dissolved and entrained gases as well as various reaction products. The redox reaction can be indefinitely sustained at a steady state. Although conditions in the reactor 402 can vary significantly over time, they do not vary so much that the reaction is adversely affected.

In some respects, the start-up parameters of the reactor 402, such as the oxygen gas concentration in the headspace and the volume occupied by the reaction mixture, are maintained during operation. For example, the oxygen gas concentrations can be maintained at the levels described above during operation. Also, the reaction mixture can occupy the same volume of the reactor 402 as the initial reaction mixture. Thus, the volume amounts described above in connection with the initial reaction mixture apply equally to the reaction mixture during operation.

The pressure in the reactor 402 is maintained at a level that is sufficient to keep the reaction progressing at a sufficient rate. In one embodiment, the pressure in the reactor 402 is maintained at at least approximately 1035 kPa, desirably, at least approximately 1380 kPa, at least approximately 1550 kPa, at least approximately 1725 kPa. In another embodiment, the pressure in the reactor 402 is maintained at no more than approximately 6900 kPa, desirably, no more than approximately 6200 kPa, or, suitably, no more than approximately 5515 kPa. In yet another embodiment, the pressure in the reactor 402 is maintained at approximately 1035 kPa to 6900 kPa, desirably, approximately 1380 kPa to 6200 kPa, or, suitably, approximately 1550 kPa to 5515 kPa.

The pressure in the reactor 402 can be maintained by selectively adding oxygen gas 406, control gas 408, or recycled gas 410. If the concentration of oxygen in the reaction mixture is low, then oxygen gas 406 is added. However, if additional oxygen is not needed, then either the control gas 408 or the recycled gas 410 is added. It should be understood that the reaction generates gas that also contributes to the pressure inside the reactor 402. Due to the high operating pressure of the reactor 402, the oxygen gas 406, the control gas 408, and/or the recycled gas 410 may be supplied at pressures greater than 6900 kPa so that they will flow into the reactor 402.

The temperature of the reaction mixture is maintained at a level that prevents the nitric acid from decomposing, but encourages the rapid oxidation of the feedstock. The temperature is controlled with the energy control system 416 as described above. In one embodiment, the temperature of the reaction mixture is maintained at no more than approximately 210° C. or, desirably, no more than approximately 205° C. In another embodiment, the temperature of the reaction mixture is maintained at at least approximately 150° C. or, desirably, at least approximately 160° C. In yet another embodiment, the temperature of the reaction mixture is maintained at approximately 150° C. to approximately 210° C. or, desirably, approximately 160° C. to approximately 205° C.

During operation, the impeller 414 is configured to disperse a sufficient amount of the oxygen gas from the headspace into the reaction mixture to facilitate oxidation of the feedstock and/or regeneration of the nitric acid. The oxygen can react with the nitric acid reduction products to form nitric acid without any processing outside of the reactor. The amount of nitric acid that is regenerated can vary. In one embodiment, at least a majority of the nitric acid is regenerated, desirably, at least 75% of the nitric acid is regenerated, or, suitably at least 90% of the nitric acid is regenerated.

The impeller 414 circulates the gas from the headspace through the reaction mixture so that the concentration of the gases in the reaction mixture is very similar to, if not the same as, the concentration of the gases that are dissolved or undissolved in the reaction mixture. This makes it possible to control the amount of oxygen gas supplied to the reaction mixture based on oxygen gas measurements taken in the headspace. In one embodiment, the concentration of dissolved and undissolved oxygen gas in the gaseous portion of the reaction mixture is within approximately 25% of the concentration of oxygen gas in the headspace, desirably, within approximately 10% of the concentration of oxygen gas in the headspace, or, suitably, within approximately 5% of the concentration of oxygen gas in the headspace.

The composition of the gas in the headspace may be adjusted to control the reaction products produced by the redox reaction. In one embodiment, the composition of gases inside the reactor meet the following parameters:

oxygen has the concentration given above, carbon dioxide 5%-25% by volume; carbon monoxide 2%-10% by volume; nitrous oxide (N2O) 2%-5% by volume with the remainder being Argon and/or Nitrogen as well as minor amounts of NOx and SOx as trace impurities.

The concentration of the oxidizing acids in the reaction mixture are the same or similar to the concentrations given above. The weight ratios of solids to acid or solids to organic material can also be the same or similar. Additional acid may be added to the reactor from the additional acid source or it may be added as part of the mixture that includes the feedstock.

In one embodiment, the acids 404 can be added directly to the reactor 402 and not added to the primary feedstock before it enters the reactor 402. In this embodiment, all of the acids are added directly to the reactor 402 in the same or similar amounts and concentrations as given above. Adding the acids in this manner lessens the material requirements for upstream components (e.g., the mixing vessel 208) because they no longer need to be capable of withstanding exposure to the acids. Adding the acids 404 directly to the reactor 402 can also make it easier and faster to later separate the heavy metals.

Inside the reactor 402, the feedstock undergoes a complex, exothermic, redox process. The organic material in the feedstock reacts to form long and short chain hydrocarbons such as fatty acid alkyl esters, aromatic hydrocarbons, complex hydrocarbons, graphitic material, and the like.

An effluent stream can be continually extracted from the reactor 402 during operation. The effluent is a runny liquid that includes a liquid fraction (alternatively referred to a liquid component) and a solid fraction (alternatively referred to as a solid component). In one embodiment, the solid fraction is approximately 2 wt % to approximately 10 wt % of the effluent with the rest being the liquid fraction. The effluent includes dissolved and entrained gas.

The solid fraction is enriched with carbon containing materials and the liquid fraction is enriched with nitrogen containing materials. In one embodiment, the weight ratio of carbon to nitrogen in the solid component, on a dry basis, is at least 2, at least 4, at least 6, or at least 10, times the weight ratio of carbon to nitrogen in the liquid component.

The solid fraction includes hydrocarbon material such as fatty acid esters and non-hydrocarbon material such as fine graphitic material. The solid fraction is approximately one third hydrocarbon material and two thirds non-hydrocarbon material. The hydrocarbon material in the solid fraction can include at least 25 wt % fatty acid esters, at least 50 wt % fatty acid esters, or at least 75 wt % fatty acid esters. The fatty acid esters can be mono-alkyl esters of long chain fatty acids (C12-C22).

The hydrocarbon material can include alkyl esters of palmitic acid and stearic acid. In one embodiment, the hydrocarbon material includes at least approximately 25 wt % of palmitic and stearic acid alkyl esters, at least approximately 35 wt % of palmitic and stearic acid alkyl esters, at least approximately 40 wt % of palmitic and stearic acid alkyl esters, at least approximately 45 wt % of palmitic and stearic acid alkyl esters, at least approximately 50 wt % of palmitic and stearic acid alkyl esters, desirably, at least approximately 55 wt % of palmitic and stearic acid alkyl esters, or, suitably, at least approximately 60 wt % of palmitic and stearic acid esters.

The hydrocarbon material can be used as a biofuel or as an additive for a biofuel. For example, the hydrocarbon material can be used as biodiesel or as an additive to biodiesel. The non-hydrocarbon material is carbon rich but takes the form of a fine graphite like material. The non-hydrocarbon material can be added to the soil as a supplement that promotes plant growth.

The pH of the effluent is the same as the reaction mixture. In one embodiment, the pH of the effluent is at least approximately 0.5, desirably, at least approximately 0.75, or, suitably, at least approximately 0.9. In another embodiment, the pH of the effluent is no more than approximately 2.0, desirably, no more than approximately 1.75, or, suitably, no more than approximately 1.5. In another embodiment, the pH of the effluent is approximately 0.5 to 2.0, desirably, approximately 0.75 to 1.75, or, suitably, approximately 0.9 to 1.5. In another embodiment, the pH of the effluent is approximately 1.3.

Upon exiting the reactor 402, the effluent may interact with the energy control system 416. The principle purpose of the energy control system 416 is to maintain the operating temperature of the reactor 402, although it could also be used to extract usable energy from the process. In one embodiment, the effluent passes through a heat exchanger that transfers heat from the effluent to the feedstock thereby pre-heating the feedstock and cooling the effluent. This helps conserve energy from the reactor 402.

It should be noted that any unreacted nitric acid in the reactor effluent can be removed by flashing it off before it is cooled below the boiling point of nitric acid. Also, any excess water may be flashed off in the energy control system 416. The need to flash or otherwise separate water from the effluent may be reduced by restricting the amount of water that is added to the feedstock.

Figure 5:
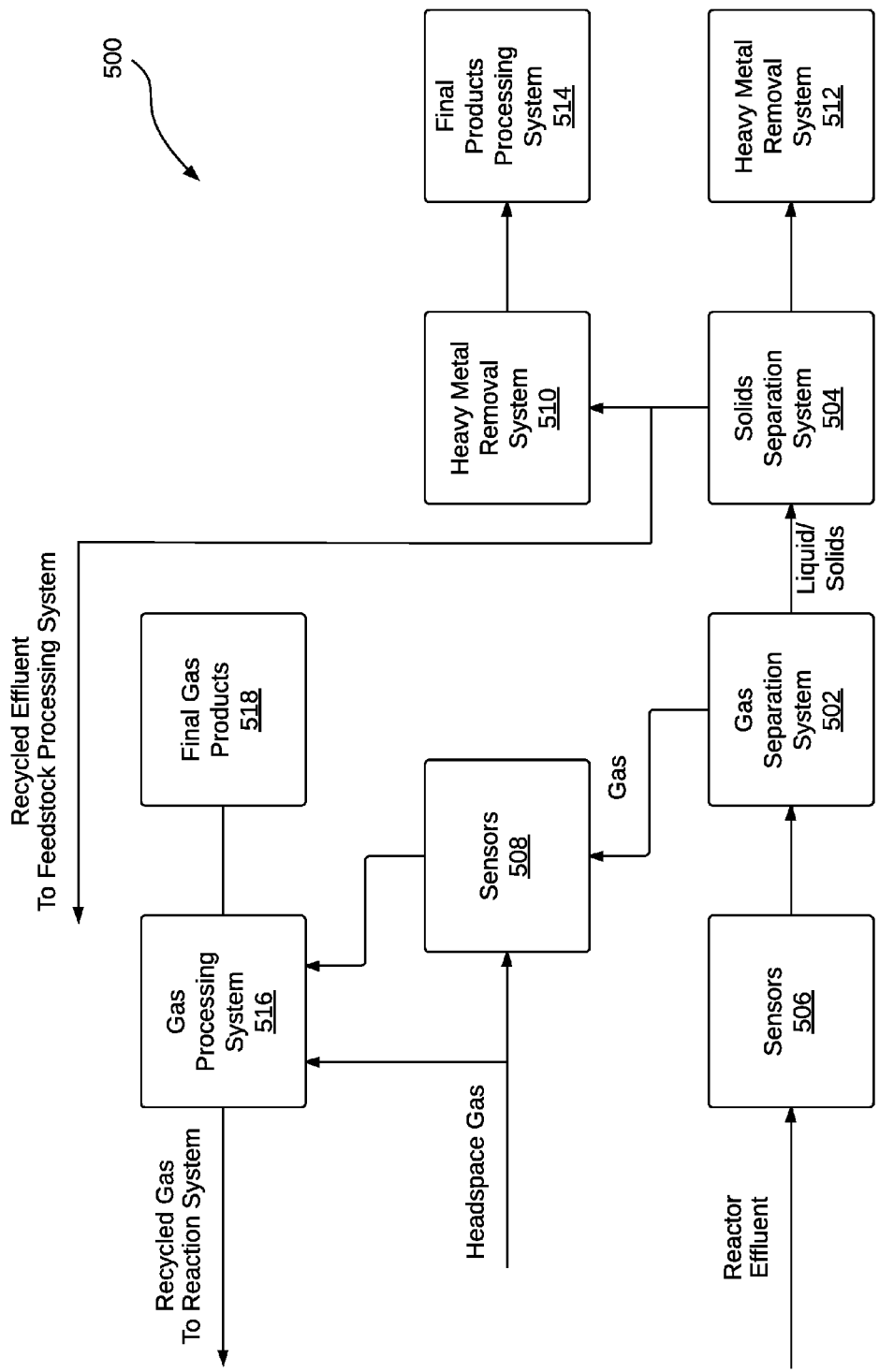
FIG. 5 is a block diagram of one embodiment of the effluent processing system in FIG. 1.

Turning to FIG. 5, a block diagram of one embodiment of an effluent processing system 500 is shown. The effluent processing system 500 receives the effluent after it exits the energy control system 416. A number of sensors 506 are used to measure parameters such as the pH and conductivity of the cooled effluent. This information is used to control the amount of acids 210, 212 that are added to the mixing vessel 208. For example, the lower the pH of the effluent, the less acid 210, 212 that needs to be added to the mixing vessel 208.

The cooled effluent flows to the gas separation system 502 where the pressure is reduced to ambient to release the dissolved and entrained gases. The effluent can be vigorously agitated to facilitate release of the dissolved and entrained gases.

The gases can be vented to the atmosphere, recycled back to the reactor 402, or separated and captured. If the gases are recycled or separated and captured, then the gases from the effluent are combined with the gases from the headspace at either the sensors 508 or the gas processing system 516. The sensors 508 can be used to measure the oxygen concentration, temperature, and other parameters. The gas processing system 516 can be used to separate the gases. The oxygen and inert gases (argon, nitrogen, and the like) can be recycled back to the reactor 402. Any remaining gas can be moved to the final gas products 518 for venting, storing, packaging, shipping and/or disposal.

The liquid/solids stream from the gas separation system 502 enters the solids separation system 504 where the solid fraction is separated from the liquid fraction so that the liquid fraction can be recycled back to the feedstock processing system 104. The solids may make it difficult to recycle some of the effluent back to the reactor 402 without clogging or plugging the piping.

The solid fraction can be separated using any of a number of techniques and/or devices. Examples include mechanical separation techniques and devices such as a rotary drum vacuum filter, centrifuge, belt filter press, plate and frame press, vacuum bed, and the like. In one embodiment, the solids are filtered out of the effluent.

The liquid fraction from the separation system 504 is either recycled back to the feedstock processing system or processed to remove heavy metals in the heavy metal removal system 510. Heavy metals may be separated from the liquid fraction in a variety of ways. In one embodiment, the liquid fraction is allowed to sit for a sufficient period of time for the heavy metals to precipitate out of the solution.

While not wishing to be bound by theory, it is believed that the heavy metals are held in solution by organic esters such as fatty acid esters. As the esters slowly degrade, the heavy metals precipitate to the bottom of the solution. The heavy metals may also react with the chloride in the solution to produce heavy metal chloride salts that precipitate out of the solution.

In another embodiment, the heavy metals are removed using an ion exchange material or activated carbon. For example, the liquid fraction is passed through a packed column that contains the ion exchange material or the activated carbon. The heavy metals are absorbed by these materials to produce a cleaned liquid fraction. In yet another embodiment, ferric oxide may be added to the liquid fraction to facilitate precipitation of the heavy metals. Any combination of these techniques may also be used.

The heavy metals removal system 510 may be capable of removing arsenic, cadmium, cobalt, mercury, molybdenum, and/or selenium. In one embodiment, the heavy metals removal system 510 is capable of removing at least 80 wt % or at least 90 wt % of arsenic, cadmium, cobalt, mercury, molybdenum, and/or selenium. In another embodiment, the heavy metals removal system 510 is capable of removing at least 80 wt % or at least 90 wt % of arsenic, and/or mercury.

In one embodiment, the heavy metals may be separated using a multistep process. For example, the heavy metals can be precipitated out of the liquid effluent, then the remainder of the heavy metals are separated using an ion exchange process. The precipitation step removes most of the arsenic, cadmium, cobalt, mercury, molybdenum, and selenium while the ion exchange process removes chromium and lead.

The cleaned liquid fraction from the heavy metal removal system 510 is mixed with ammonia in the final products processing system 514. The ammonia neutralizes the acids until it reaches a pH that makes it suitable for use as a fertilizer. The resulting liquid product contains a mixture of organic and inorganic materials that make it a very good fertilizer.

The amount of ammonia added to the cleaned liquid fraction may vary depending on the relevant soil conditions. For example, if the soil is alkaline, it may be desirable to apply slightly acidic fertilizer to neutralize the soil. In this situation, ammonia is added to bring the pH of the solution up to approximately 4.0 or approximately 4.5. If the soil is acidic, then it may be desirable to add enough ammonia to create a basic solution.

The solid fraction from the separation system 504 enters another heavy metal removal system 512 where the solid fraction is processed to remove most or all of the heavy metals. It should be appreciated that, in some embodiments, the heavy metal removal system 512 may be the same as the heavy metal removal system 510.

The heavy metals may be removed from the solid fraction in any of a number of ways. In one embodiment, the heavy metals are removed from the solid fraction using the cleaned liquid fraction. For example, a portion of the cleaned liquid fraction is mixed with the solid fraction to extract the heavy metals from the solid fraction. The resulting liquid is reprocessed through the heavy metal removal system 510 to isolate and eliminate the heavy metals. In another embodiment, the heavy metals are removed using a solvent extraction process that is capable of solvating the heavy metals.

As described above, the solid fraction can be divided up and used as a biofuel, fertilizer, and/or a soil amendment.

Figure 6:
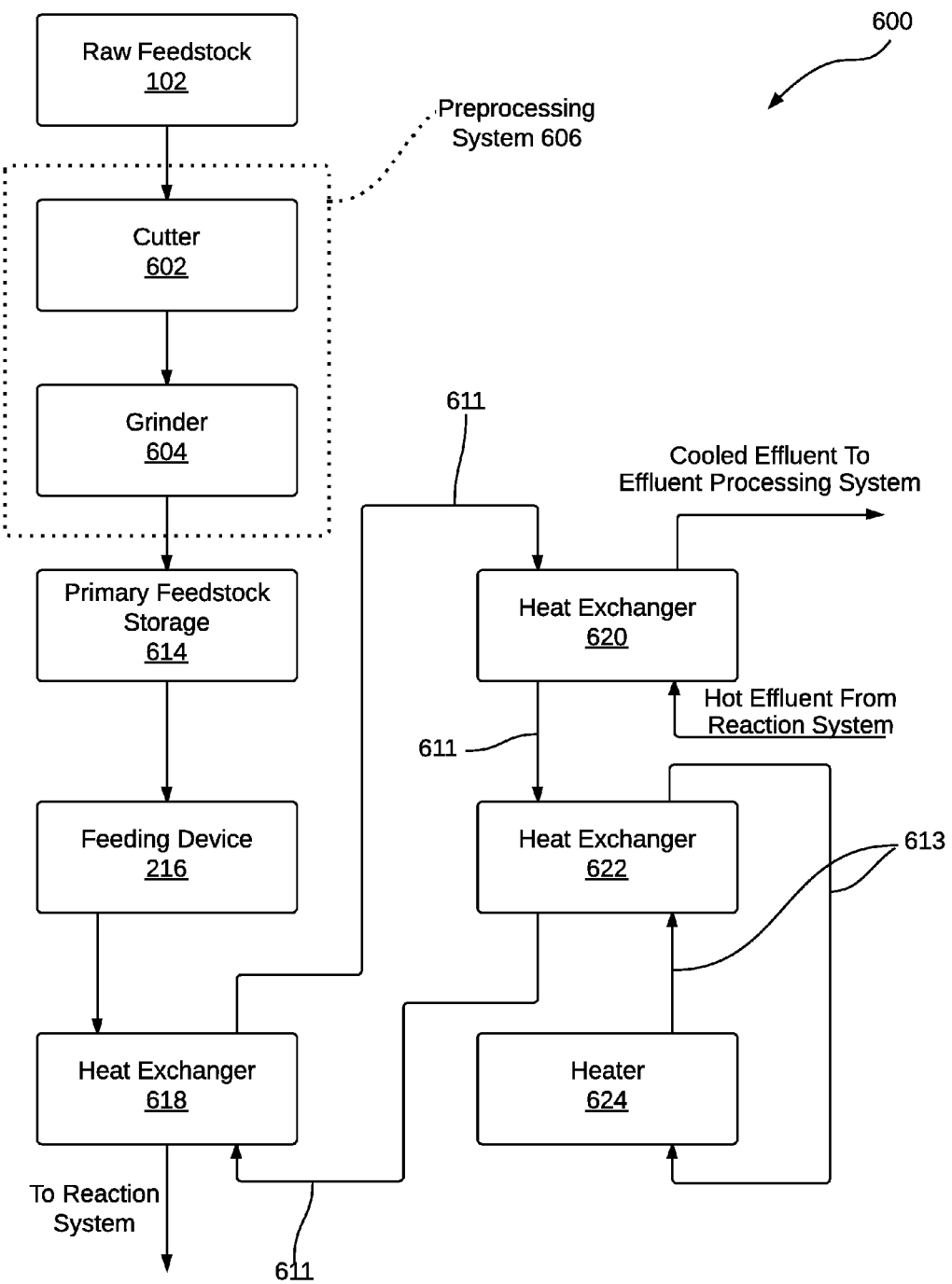
FIG. 6 is a block diagram of another embodiment of the feedstock processing system in FIG. 1.

FIG. 6 shows a block diagram of another embodiment of a feedstock processing system 600. The sewage material 102 initially enters a preprocessing system 606 where the sewage material 102 is comminuted in a cutter 602 and a grinder 604 positioned in series. The preprocessing system 606 can have any of the features described above in connection with the preprocessing system 206, including particle size.

The cutter 602 and the grinder 604 are each associated with a tank where the sewage material 102 is stored. The sewage material 102 is initially pumped as a batch into the tank associated with the cutter 602. The sewage material 102 is circulated through the cutter 602 until it reaches a uniform small size. The sewage material 102 is then pumped as a batch into the tank associated with the grinder 604 where it is circulated through the grinder 604 until it reaches a uniform consistency. The sewage material 102 is then pumped into the primary feedstock storage 614—e.g., a tank.

It should be appreciated that the configuration of the preprocessing system 606 can vary substantially from what is shown in FIG. 6. For example, the preprocessing system 606 can include additional processing steps such as dewatering and the like. Also, the cutter 602 and the grinder 604 can be combined into a single device that is capable of comminuting the sewage material 102 to the desired particle size.

The primary feedstock is pumped out of the primary feedstock storage 216 and into a heat exchanger 618 with the feeding device 216. The feeding device 216 can be any suitable feeding device including any of those discussed above. In a preferred embodiment, the feeding device 216 is a high pressure pump with one or more check valves that prevent backflow of the primary feedstock. The feeding device 216 pushes the primary feedstock past the check valve using a hydraulic or pneumatic ram configuration. The feeding device 216 moves through a cycle where the primary feedstock is injected through the check valve by extending (or retracting) the ram and is refilled by retracting the ram (or extending) the ram.

The feeding device 216 pressurizes the primary feedstock to the reaction pressures described above. A single device can be used to produce a pulsed flow of primary feedstock or two or more devices can be positioned in parallel to produce a continuous or approximately continuous flow of primary feedstock.

The pressurized primary feedstock passes through the heat exchanger 618 where it is heated to the desired reaction temperatures described above. In one embodiment, the primary feedstock is heated to approximately 180° C.

The primary feedstock is heated by the hot reactor effluent and a supplemental heater 624. In the embodiment shown in FIG. 6, heat is transferred from the hot reactor effluent to a fluid 611 in a heat exchanger 620. The fluid 611 can be any suitable fluid such as water, oil, and the like.

The hot reactor effluent provides a significant amount of heat to the fluid 611, but typically it is not enough to heat the primary feedstock to the desired temperature. The fluid 611 is heated further with a supplemental heater 624 and a corresponding heat exchanger 622. For example, the heater 624 heats a fluid 613 (water, oil, or the like) that then passes through the heat exchanger 622 and heats the fluid 611. The fluid 611 then passes through the heat exchanger 618 where it heats the primary feedstock.

It should be appreciated that the heat exchangers 618, 620, 622 can have any suitable configuration. In one embodiment, the heat exchangers 618, 620 are shell and tube heat exchangers and the fluid 611 flows through the shell side of the heat exchangers 618, 620. This configuration may be more efficient than simply using a single heat exchanger where the effluent flows through the tube side and the primary feedstock flows through the shell side.

The heat exchangers 618, 620, 622 can be made of any suitable material. The heat exchangers 618, 622 are not exposed to acids so they can be made of common materials such as carbon steel, stainless steel, and the like. The heat exchanger 620 is exposed to acids in the hot reactor effluent so it should be made of more robust materials such as titanium, stainless steel (e.g., G-35 stainless steel), zirconium (zirconium 702), and the like.

It should be appreciated that the primary feedstock can be heated using a variety of additional configurations. For example, in one embodiment, the primary feedstock can be heated with the supplemental heater 624 without involving the hot reactor effluent. In another embodiment, the heat exchangers 618, 620 can be combined so that the hot reactor effluent and the primary feedstock pass through a single heat exchanger making the fluid 611 unnecessary. Numerous other changes can be made as well.

Figure 7:
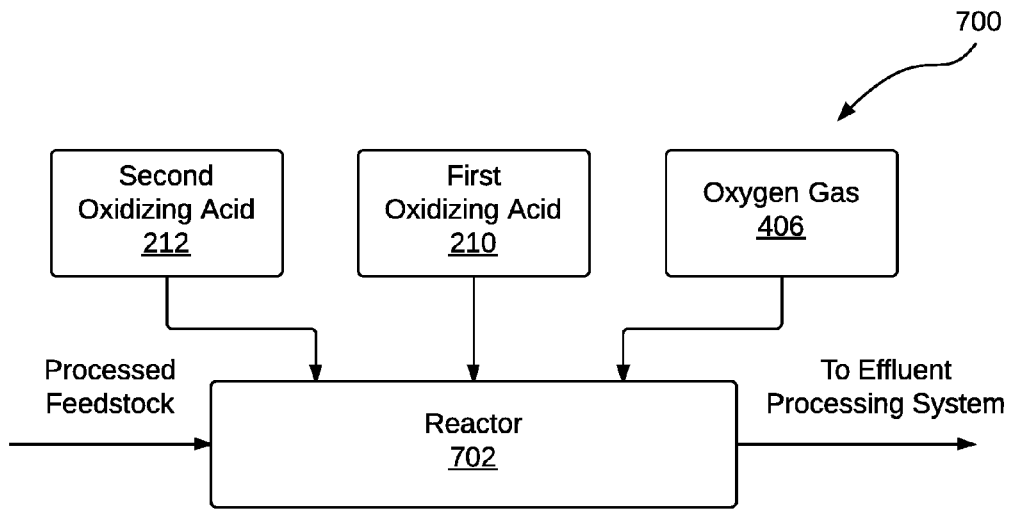
FIG. 7 is a block diagram of another embodiment of the reaction system in FIG. 1.

The primary feedstock is now at the desired reaction pressure and temperature and is ready to be fed into the reaction system 700 shown in FIG. 7. The reactor 702 can be any of the reactors described above in connection with reactor 402. In a preferred embodiment, the reactor 702 is a pipe or tubular reactor made of plastic lined steel, e.g., carbon steel or stainless steel lined on the inside with polytetrafluoroethylene (PTFE), polyfluoroalkoxy (PFA), or other fluoropolymers. The pipe includes multiple curves or elbows that facilitate mixing of the reaction mixture as it flows through the pipe.

The first oxidizing acid 210, second oxidizing acid 212, and the oxygen gas 406 can be added in any suitable configuration or order. In one embodiment, the components are added to the reactor 702 in the following order: the second oxidizing acid 212 is added first, the first oxidizing acid 210 is added second, and the oxygen gas 406 is added last (or added in multiple locations downstream of the acids 212, 210). In other embodiments, the acids 210, 212 and oxygen 406 can be added at the same time or in any other order.

The reaction mixture is formed as soon as any oxidizing acid is added to the primary feedstock. The dwell time of the reaction mixture in the reactor 702 is sufficient for the sewage material 102 to react to form the products described above. In general, lower quantities of acids 210, 212 and/or oxygen gas 406 increases the dwell time necessary to produce the desired reaction products and vice versa. In one embodiment, the reaction mixture 702 has a dwell time of approximately 10 seconds to 2 minutes or 45 seconds to 1 minute.

The concentration of the reaction mixture can be the same as that given above in connection with the reactor 402. It should be appreciated that any other characteristics of the reactor 402 can apply equally to the reactor 702.

The extent of the reaction can be monitored by measuring the temperature of the reactor 702 at various points. The reaction is exothermic so the temperature of the reaction mixture should increase as it moves through the reactor 702. The difference in temperature from the beginning of the reactor 702 to the end can be used to determine the extent of the reaction.

The hot effluent leaves the reactor 702 and is immediately cooled in the heat exchanger 620 (FIG. 6). The pressure is also reduced soon after the effluent exits the reactor 702 (e.g., a valve is used to reduce the pressure). The reaction is effectively terminated when the reaction mixture is cooled and the pressure is released.

Figure 8:
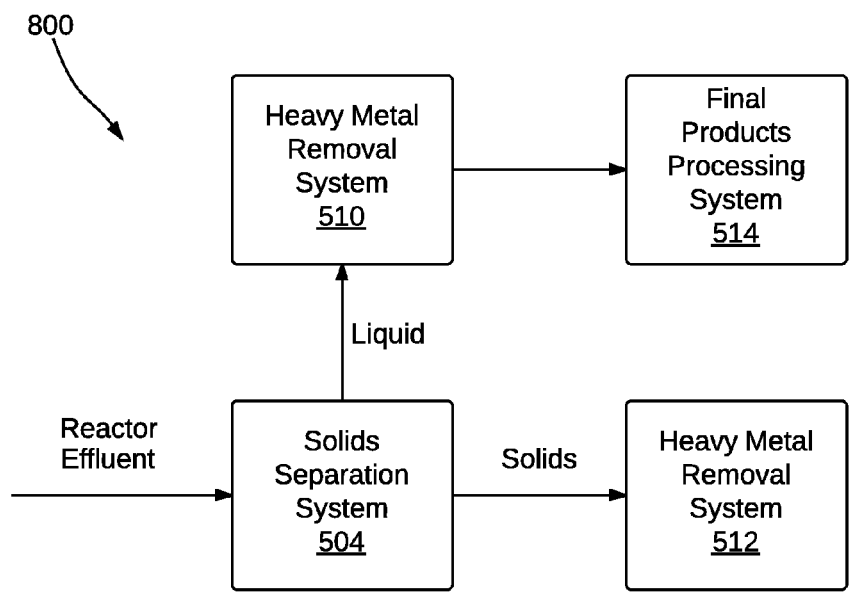
FIG. 8 is a block diagram of another embodiment of the effluent processing system in FIG. 1.

The reactor effluent leaves the heat exchanger 620 and enters a effluent processing system 800 as shown in FIG. 8. The solids are separated from the liquid in the solids separation system 504. The heavy metals are removed from the liquid in the heavy metal removal system 510, and the heavy metals are removed from the solids in the heavy metal removal system 512. The clean liquid (after heavy metal removal) is then processed in the final products processing system 514. The systems 504, 510, 512, 514 operate in the same or similar manner as described above.

The aqueous phase oxidation process 100 can be controlled using a variety of methods. In one embodiment, the process 100 can be monitored and controlled remotely using various wired and/or wireless communication systems. The process 100 can include sensors that monitor the various material levels, flows, temperatures, pressures, and any other parameters associated with the process 100. The information obtained from the sensors can be transmitted to a remote location where an operator can control the various parameters of the system 100.

In one embodiment, the information from the process 100 is stored on a server and made available through a website. The website can be used to access the data about the process 100 and to control the process 100. For example, an operator can use the website to remotely increase the amount of oxygen gas added to the reaction mixture or increase the feed rate of the feedstock. Any of the parameters described above in connection with the process 100 can be controlled through the website.

A separate website or login credentials can be provided to view the various parameters of the process 100 without the ability to change or otherwise control the process 100. This can be useful to allow the owner of a waste disposal site where the process 100 is being used to monitor the parameters of the process 100 without having the ability to change or alter it.

In another embodiment, the physical components used in the process 100 can be organized into a modular design that makes it easier to transport, set-up, and operate. For example, the various components can be organized into different skids that can be easily transported and installed at a waste processing site. The skids can each be a self-contained unit that fits in or on a semi-trailer—e.g., the skids are no more than approximately 8 feet wide to allow them to fit on the semi-trailer. The skids are capable of being loaded and unloaded from with a conventional forklift.

In one embodiment, the physical components can be divided into the following skids: feedstock preparation skid, reactor skid, separations skid, and support skid. The feedstock preparation skid can include those components that are roughly associated with the feedstock processing system 104. This can include raw feedstock storage tank, comminuting components such as the grinder/cutter, dewatering equipment, primary feedstock storage tank, pumps, and so forth.

The reactor skid can include those components that are roughly associated with the reaction system 106. This can include the reactor, heat exchangers, process control equipment, acids, and the like. The process control equipment can include pneumatic controls housed in an enclosed cabinet at one end of the skid and software and electronics housed in a second cabinet at the other end of the skid.

The separations skid can include those components that are roughly associated with the effluent processing system 108. This can include separation devices such as filters, settling tanks and the like, storage tanks, and so forth.

The support skid includes additional components that may be needed to run the process 100. This can include things like a generator, a compressor, a heater (to heat the primary feedstock or to just heat the skids during the winter), and the like.

The skids can be monitored and tracked using various asset management systems and techniques. For example, the skids can be individually tracked using wireless/GPS sensors included on the skids. Also, the skids can be monitored and controlled remotely as described above.

It should be appreciated that the number and content of the skids can be changed. Also, some materials can be provided outside of a skid. For example, the acids may be stored separately from any of the skids in containment vessels. This prevents the acid from doing any significant damage if it accidentally spills.

EXAMPLES

The following examples are provided to further illustrate the disclosed subject matter. They should not be used to constrict or limit the scope of the claims in any way.

Example 1

In this example, sewage was processed to produce fertilizer and/or otherwise treat the sewage to render it suitable to be discharged into the environment. The sewage was obtained from a sewage treatment plant and contained 5.2 wt % solids with the rest being almost entirely water. The solid particles in the sewage were suspended in the liquid so that the texture of the sewage resembled a readily pourable slurry.

The sewage was dewatered by mixing 75.71 liters of sewage with 1 liter of a flocculant solution and agitating the mixture until the solid particles in the sewage clustered or clumped together. The flocculant solution contained 10 ml of Core Shell 71307 cationic flocculant and 990 ml of water. The Core Shell 71307 flocculant was obtained from the Nalco Company located in Naperville, Ill.

The liquid was separated from the mixture to yield 19.543 kg of dewatered sewage. The dewatered sewage contained 20.2 wt % solid material and the rest was water. It had a soft moldable texture. The dewatered sewage was fed into a reactor in the following manner.

The reactor was initially filled with a liquid mixture that included 1,000 ml water, 30 ml aqueous nitric acid solution (54 wt % acid), and 15 ml aqueous sulfuric acid solution (93 wt % acid). The pH of the liquid in the reactor was 1.0. The reactor was heated to about 180° C. and pressurized to about 4,826 kPa.

The headspace of the reactor was filled with 50% oxygen gas by volume. The reactor included a gas entrainment impeller that dispersed the headspace gases into the reaction mixture. The pressure was maintained by adding oxygen gas or air. Air was added unless the oxygen concentration in the headspace was low, then oxygen was added. If the pressure was high, gas was released from a valve at the top of the reactor.

During the start-up phase of the process, the dewatered sewage was mixed with an acid solution in a blender to produce a mixture having a pH of 1.0. The blender was used to comminute the solids in the feedstock to make it uniform. The feedstock included 175 gm dewatered sewage, 450 ml water, 15 ml aqueous nitric acid solution (54 wt % acid), and 7.5 ml aqueous sulfuric acid solution (93 wt % acid). This was fed into the reactor until it began to produce a steady stream of effluent material.

The process transitioned to a steady state phase when there was sufficient effluent produced to recycle a portion of it back to the beginning. The recycled effluent was added to the feedstock in place of the water that was used during the start-up phase. The amount of acids added to the feedstock was lowered since the effluent contained some acid. Enough acid was added, however, to bring the feedstock to a pH of 1.0. The result was that the feedstock included 175 gm dewatered sewage, 450 ml of recycled effluent (pH approximately 1.3), 10 ml aqueous nitric acid solution (54 wt % acid), and 4 ml aqueous sulfuric acid solution (93 wt % acid). The temperature of the recycled effluent was 50 to 70° C.

The feedstock entered the reactor through two hydraulic rams that were alternately isolated from the high pressure reactor using valves. The valve between one hydraulic ram and the reactor was opened to allow the ram to feed the feedstock into the reactor while the valve between the other ram and the reactor was closed to allow it to be reloaded without depressurizing the reactor. This made it possible to feed a continuous supply of feedstock to the reactor without depressurizing the reactor.

The effluent was a runny liquid mixture that contained a significant amount of solids and had a steady state pH of 1.3. The solids had a tendency to clump together and/or stick to the equipment, which made it difficult to process.

The effluent also contained a significant amount of dissolved and/or entrained gas. Approximately half of the gas released by the reactor was dissolved and/or entrained in the effluent. The other half exited the reactor through a bleed off valve at the top of the reactor. The amount of gas that exited through the effluent was 775 liters and the amount of gas that exited through the valve at the top of the reactor was 780 liters. The gas that exited through the top of the reactor included gas that was released to reduce the pressure in the reactor and gas that was slowly released across an oxygen sensor that was used to monitor the oxygen concentration in the reactor.

After exiting the reactor, the effluent was cooled and the pressure was reduced to atmospheric pressure. This released much of the dissolved and entrained gas, which was then collected. The degassed effluent was then subjected to vacuum filtration to separate the liquid from the solids.

The filtered liquid was divided and a portion was recycled back to the beginning of the process as described above. The remaining liquid was mixed with an aqueous ammonia solution (24% ammonia) until the pH of the solution reached 4.5. The ammonia reacted with the acids in the effluent to produce ammonium salts that can be used as fertilizer.

Table 1 below shows the composition of the feedstock, liquid effluent, and solid effluent. The composition of the liquid effluent was tested before ammonia was added. The composition was determined using EPA methods 3050A (digestion) and 6010 (determination).

TABLE 1

| Effluent composition | | | | |
|---|---|---|---|---|
| | Minimum Detectable Level (MDL) (mg/kg) | Feedstock (mg/kg) (dry basis) | Effluent Liquids (mg/kg) | Effluent Solids (mg/kg) (dry basis) |
| Heavy Metals | | | | |
| Arsenic | 0.76 | 12.5 | 3.0 | 19.0 |
| Cadmium | 0.14 | 2.5 | 1.0 | 4.9 |
| Chromium | 0.13 | 22.1 | 19.6 | 238.5 |
| Cobalt | 0.22 | 1.0 | 0.5 | 1.9 |
| Copper | 0.39 | 86.7 | 34.7 | 171.8 |
| Mercury | 0.003 | — | .016 | — |
| Molybdenum | 0.15 | 3.2 | 1.1 | 27.5 |
| Nickel | 0.31 | 9.2 | 13.9 | 65.0 |

TABLE 1-continued

| | Effluent composition | | | |
|---|---|---|---|---|
| | Minimum Detectable Level (MDL) (mg/kg) | Feedstock (mg/kg) (dry basis) | Effluent Liquids (mg/kg) | Effluent Solids (mg/kg) (dry basis) |
| Lead | 2.31 | 10.5 | <MDL | 72.8 |
| Selenium | 1.12 | 0.5 | <MDL | 2.9 |
| Zinc | 0.54 | 137.5 | 67.3 | 172.2 |
| Plant Nutrients | | | | |
| Total Nitrogen Atoms | 57 | 8,269 | 12,579 | 9,725 |
| Phosphorous | 3.6 | 2,559 | 627 | 10,750 |
| Phosphorous Pentoxide (P205) | — | 5,886 | 1,441 | 24,725 |
| Potassium | 29.6 | 382 | 113 | 797 |
| Potassium Oxide (K20) | — | 458 | 135 | 956 |
| Sulfur | 10.6 | 1,913 | 7,199 | 54,220 |
| Calcium | 12.5 | 6,415 | 640 | 51,210 |
| Magnesium | 4.2 | 678 | 315 | 975 |
| Iron | 64.3 | 1,821 | 192 | 13,090 |
| Manganese | 1.8 | 22 | 11 | 41.3 |
| Boron | 0.12 | 6.1 | 0.5 | 40.2 |
| Sodium | 13.2 | 726 | 292 | 1,058 |
| Chloride | 0.75 | 824 | 404 | 225 |
| Total Carbon Atoms | 30 | 97,500 | 30,300 | 290,500 |
| Carbon/Nitrogen Ratio | — | 11.79 | 2.41 | 29.87 |

The process conditions were such that the dewatered sewage reacted to produce valuable products. The types of acids used and the relative concentrations of each were sufficient to oxidize the sewage to produce valuable products, but not so much that the sewage was completely oxidized to carbon dioxide, nitrogen gas, and water. For example, the process would produce fewer desirable reaction products if greater amounts of nitric acid were used.

The effluent can be used as a fertilizer and/or other soil amendment. The liquid effluent may be sprayed on the soil as a liquid fertilizer and the solid effluent may be spread on or worked into the soil. The pH of the liquid effluent may be adjusted depending on the condition of the soil. For example, the pH may be somewhat acidic if the liquid effluent will be applied to alkaline soil. In the alternative, the pH may be adjusted to be basic if the liquid will be applied to acidic soil.

The process was run for ten hours and consumed approximately 7920 gm of dewatered sewage, 475 ml of aqueous nitric acid (54 wt % acid), 143.5 ml of aqueous sulfuric acid solution (93 wt % acid), and 1,040 liters of oxygen gas. The process produced approximately 9,060 ml of liquid effluent and 474 gm of solids (on a dry basis). A minor amount of effluent remained in the process equipment and was not included in the preceding amounts. The process also produced 1,555 liters of gas. Approximately half of the gas exited the reactor through the headspace and the other half was dissolved or entrained in the effluent.

The temperature and pressure in the reactor fluctuated somewhat depending on the reaction conditions. During the steady state phase of the process, the temperature in the reactor was maintained at approximately 180° C. although it fluctuated at times from 150° C. to 200° C. The pressure in the reactor was maintained at approximately 4,826 kPa plus or minus 200 kPA.

Example 2

In this example, various methods and materials were tested for removing heavy metals from the liquid effluent. The tests were especially focused on removing heavy metals such as arsenic, cadmium, chromium, mercury, lead, and selenium. The other heavy metals tested are either of less concern or may even be considered micronutrients.

The liquid effluent was prepared using the method described in Example 1 and divided into six samples. The samples were processed as follows. In Sample 1, the liquid effluent was allowed to sit undisturbed in a flask for about a month. The heavy metals separated to the bottom of the flask and the remaining liquid was drawn off the top. In Samples 2-5, the liquid effluent was mixed with the hydrated ion exchange beads shown in Table 2. In each sample, 100 ml of liquid effluent was mixed with 1 gm of ion exchange beads and gently shaken. In Sample 6, 100 ml of liquid effluent was mixed with 1 gm of ferric oxide ($Fe_2O_3$) and gently shaken. The composition of the resulting liquid from each sample was then tested.

TABLE 2

| Ion exchange beads | |
|---|---|
| Sample | Ion Exchange Beads |
| Sample 2 | XUR-1525-L10-018 from the Dow Chemical Company |
| Sample 3 | XUR-1525-L10-019 from the Dow Chemical Company |
| Sample 4 | XUR-1525-L10-020 from the Dow Chemical Company |
| Sample 5 | XUR-1525-L10-021 from the Dow Chemical Company |

The composition of the liquid samples produced from each test are shown in Table 3. One notable result is Sample 1. The passive precipitation process removed arsenic, cadmium, mercury, and selenium to levels that are undetectable. While not wishing to be bound by theory, it is believed that the heavy metals form a complex with organic esters that keep the heavy metals in solution. The esters break down over time causing the heavy metals to drop out of solution. The ion exchange beads used in Sample 5 show promise for removing the chromium and lead from the liquid effluent. It should also be noted that the plant nutrients were not significantly affected in any of the tested samples.

TABLE 3

| Heavy metal removal | | | | | | | |
|---|---|---|---|---|---|---|---|
| | MDL (mg/kg) | Sample 1 | Sample 1 (precip) | Sample 2 | Sample 3 | Sample 4 | Sample 5 | Sample 6 |
| Heavy Metals | | | | | | | | |
| Arsenic | 0.76 | <MDL | 14.7 | <MDL | <MDL | <MDL | <MDL | <MDL |
| Cadmium | 0.14 | <MDL | <MDL | <MDL | <MDL | <MDL | <MDL | <MDL |
| Chromium | 0.13 | 14.9 | 18.2 | 13.9 | 10.8 | 10.7 | 9.8 | 11.9 |
| Cobalt | 0.22 | <MDL | <MDL | <MDL | <MDL | <MDL | <MDL | <MDL |
| Copper | 0.39 | 32.7 | 78.9 | 32.2 | 28.5 | 27.1 | 27.2 | 28.4 |

TABLE 3-continued

Heavy metal removal

|  | MDL (mg/kg) | Sample 1 | Sample 1 (precip) | Sample 2 | Sample 3 | Sample 4 | Sample 5 | Sample 6 |
| --- | --- | --- | --- | --- | --- | --- | --- | --- |
| Mercury | 0.003 | <MDL | 18.313 | <MDL | <MDL | <MDL | <MDL | <MDL |
| Molybdenum | 0.15 | <MDL | 41.8 | <MDL | <MDL | <MDL | <MDL | <MDL |
| Nickel | 0.31 | 11.0 | 2.9 | 11.2 | 11.2 | 11.1 | 10.8 | 11.0 |
| Lead | 2.31 | 3.4 | 82.8 | 4.0 | 4.0 | 3.9 | 3.6 | 3.2 |
| Selenium | 1.12 | <MDL | 41.4 | <MDL | <MDL | <MDL | 1.3 | 3.4 |
| Zinc | 0.54 | 64.0 | 15.1 | 50.0 | 65.0 | 64.4 | 62.4 | 58.1 |
| Plant Nutrients | | | | | | | | |
| Total Nitrogen Atoms | 57 | 11,643 | 3,989 | 12,296 | 12,350 | 12,257 | 12,058 | 12,529 |
| Phosphorous | 3.6 | 525 | 522 | 364 | 476 | 484 | 405 | 368 |
| Phosphorous Pentoxide (P2O5) | — | 1,207 | 1,200 | 837 | 1,095 | 1,113 | 932 | 847 |
| Potassium | 29.6 | 114 | 41 | 113 | 126 | 112 | 104 | 114 |
| Potassium Oxide (K2O) | — | 136 | 49 | 135 | 151 | 135 | 124 | 136 |
| Sulfur | 10.6 | 6,698 | 181,500 | 6,572 | 6,530 | 6,708 | 6,547 | 6,721 |
| Calcium | 12.5 | 576 | 192,800 | 492 | 455 | 450 | 436 | 1,203 |
| Magnesium | 4.2 | 303 | 89 | 295 | 310 | 307 | 298 | 366 |
| Iron | 64.3 | 122 | 633 | 86 | 81 | 93 | 53 | 102 |
| Manganese | 1.8 | 4.0 | <MDL | 2.1 | 4.0 | 3.9 | 3.5 | 8.9 |
| Boron | 0.12 | 0.9 | 3.5 | 0.9 | 0.9 | 0.9 | 0.7 | 0.9 |
| Sodium | 13.2 | 271 | 107 | 271 | 277 | 273 | 265 | 275 |
| Total Carbon Atoms | 30 | 28,900 | 54,700 | 29,700 | 28,900 | 28,500 | 29,600 | 29,700 |
| Carbon/Nitrogen Ratio | — | 2.48 | 13.71 | 2.42 | 2.34 | 2.33 | 2.45 | 2.37 |

Example 3

In this example, the composition of the solid organic materials produced by the process was tested. The sewage was obtained and dewatered in the manner described in Example 1 except that it was dewatered to 17 wt % solid content. The reactor was initially filled with a liquid mixture that included 1,450 recycled effluent having a pH of 1.3 (from a previous run), 8.5 ml aqueous nitric acid solution (54 wt % acid), and 21.5 ml aqueous sulfuric acid solution (93 wt % acid). The pH of the liquid in the reactor was 1.0. The reactor was heated to about 180° C. and pressurized to about 4,826 kPa.

The headspace of the reactor was filled with 50% oxygen gas by volume. The reactor included a gas entrainment impeller that dispersed the headspace gases into the reaction mixture. The pressure was maintained by adding oxygen gas or air. Air was added unless the oxygen concentration in the headspace was low, then oxygen was added. If the pressure was high, gas was released from a valve at the top of the reactor.

The dewatered sewage was mixed with the recycled liquid fraction of the effluent (if this was at start-up, the recycled liquid fraction was obtained from a previous run) in a blender to produce a mixture having a pH of 1.0. The blender was used to comminute the solids in the feedstock to make it uniform. The feedstock included 175 gm dewatered sewage, 450 ml recycled liquid effluent, 3.5 ml aqueous nitric acid solution (54 wt % acid), and 9.0 ml aqueous sulfuric acid solution (93 wt % acid). This was fed into the reactor.

The feedstock entered the reactor through two hydraulic rams that were alternately isolated from the high pressure reactor using valves. The valve between one hydraulic ram and the reactor was opened to allow the ram to feed the feedstock into the reactor while the valve between the other ram and the reactor was closed to allow it to be reloaded without depressurizing the reactor. This made it possible to feed a continuous supply of feedstock to the reactor without depressurizing the reactor.

The effluent was a runny liquid mixture that contained a significant amount of solids and had a steady state pH of 1.3. The solids had a tendency to clump together and/or stick to the equipment, which made it difficult to process.

The effluent also contained a significant amount of dissolved and/or entrained gas. Approximately half of the gas released by the reactor was dissolved and/or entrained in the effluent. The other half exited the reactor through a bleed off valve at the top of the reactor. The amount of gas that exited through the effluent was 775 liters and the amount of gas that exited through the valve at the top of the reactor was 780 liters. The gas that exited through the top of the reactor included gas that was released to reduce the pressure in the reactor and gas that was slowly released across an oxygen sensor that was used to monitor the oxygen concentration in the reactor.

After exiting the reactor, the effluent was cooled and the pressure was reduced to atmospheric pressure. This released much of the dissolved and entrained gas, which was then collected. The degassed effluent was then subjected to vacuum filtration to separate the liquid from the solids.

The filtered liquid was divided and a portion was recycled back to the beginning of the process as described above. The remaining liquid was mixed with an aqueous ammonia solution (24% ammonia) until the pH of the solution reached 4.5. The ammonia reacted with the acids in the effluent to produce ammonium salts that can be used as fertilizer.

The organic materials in the solid component of the effluent were extracted using a solvent and analyzed. The results are shown in Table 4 below. The materials listed in Table 4 represent 93% of the amount of the total organic materials identified. The remaining 7% are not listed due to their low concentrations.

TABLE 4

Composition of the organics in the solid component of the effluent

| Material | Wt % | Material | Wt % |
|---|---|---|---|
| Methyl palmitate (Hexadecanoic acid, methyl ester) | 34.665 | 8-Octadecenoic acid, methyl ester | 1.137 |
| Methyl stearate (Octadecanoic acid, methyl ester) | 27.541 | 8,11-Octadecadienoic acid, methyl ester | 0.758 |
| Methyl myristate (Tetradecanoic acid, methyl ester) | 5.954 | Methyl 14-methylpalmitate (14-methylhexadecanoic acid, methyl ester) | 1.283 |
| Methyl oleate ((Z)-9-Octadecenoic acid, methyl ester) | 4.973 | Dimethyl azelate (Nonanedioic acid dimethyl ester) | 0.379 |
| Methyl pentadecanoate (Pentadecanoic acid, methyl ester) | 3.201 | Methyl caprate (Decanoic acid, methyl ester) | 0.357 |
| Octadecanoic acid, 10-oxo-, methyl ester | 2.576 | 3-Hydroxyoctadecanoic acid, methyl ester | 0.357 |
| Methyl icosanoate (Eicosanoic acid, methyl ester) | 2.241 | Methyl isopalmitate (14-Methylpentadecanoic acid, methyl ester) | 0.335 |
| Methyl laurate (Dodecanoic acid, methyl ester) | 1.862 | 3-Hydroxydodecanoic acid, methyl ester | 0.323 |
| Methyl heptadecanoate (Heptadecanoic acid, methyl ester) | 1.438 | Dodecyl alcohol (1-Hydroxydodecane) | 0.312 |
| Methyl docosanoate (Docosanoic acid, methyl ester) | 1.427 | Linolelaidic acid, methyl ester (delta 9-trans 12-trans Octadecadienoic acid, methyl ester) | 0.301 |
| 12-Methyltetradecanoic acid, methyl ester | 1.249 | Methyl benzoate | 0.290 |
| | | Total | 93% |

The results show that the organic materials in the solid fraction of the effluent are primarily made up of mono-alkyl esters of long chain fatty acids (C12-C20). These materials are valuable and can be used for biodiesel, biolubricants, and the like. The liquid fraction of the effluent included a de minimis amount of organic material.

Example 4

In this example, the process was run a number of times using only sulfuric acid and one time using a mixture of sulfuric and nitric acid. The run with nitric acid was used for comparison purposes with the other runs. The feed material was sewage material obtained from a sewage treatment plant. The sewage material included approximately 4.5% to 5.5% solids with the rest being almost entirely water. The solid particles in the sewage were suspended in the liquid so that the texture of the sewage resembled a readily pourable slurry. The sewage material was not dewatered, but it was comminuted in a blender to make the solids roughly uniform in size.

Each run was performed as a batch run. The reactor was heated to about 180° C. and pressurized to about 5515 kPa. The sewage material was mixed with the acid and then fed into the reactor using a hydraulic ram. The pH of the mixture just before entering the reactor was 1.0. The amount of each material is shown in Table 5 below.

TABLE 5

| Run parameters | | | | | | | |
|---|---|---|---|---|---|---|---|
| | Feed (mL) | Sulfuric Acid (mL) (93 wt % acid) | Nitric Acid (mL) (54 wt % acid) | Pressure (kPa) | Temp (C.) | pH of Effluent | Reaction time |
| Run 1 | 1300 | 4.5 | 0 | 5515 | 180 | 1.3 | 24 |
| Run 2 | 1300 | 12 | 0 | 5515 | 180 | 1.3 | 18 |
| Run 3 | 1150 | 9 | 6 | 5515 | 180 | 1.3 | 8 |
| Run 4 | 1150 | 12 | 0 | 5515 | 180 | 1.3 | 18 |

Oxygen gas was bubbled into the reactor at a rate of 1.5 L/min for the duration of the reaction. The concentration of oxygen in the reactor was not measured, but the amount that was added ensured that it was an oxygen rich environment. The oxygen gas entered the reactor through a sparger positioned at the bottom of the reactor. The reactor included an impeller that rotates and creates a vortex which draws the gas from the headspace down into the reaction mixture. The pressure was maintained at the desired level by adding air to the reactor or releasing gas from the headspace.

The results showed that the effluent from the run that included nitric acid is preferable to effluent from the runs that included only sulfuric acid. The effluent from the sulfuric only runs had cellulosic material in it and larger particle sizes. The large particle sizes made it easier to filter the solids from the effluent, but the presence of cellulosic material was a drawback. The effluent from the run that included nitric acid was a runny liquid mixture that contained a significant amount of small particle solids and very little, if any, cellulose material. The organic material was broken down further by the nitric acid making it better suited for use as a soil amendment or biofuels.

The nitric acid also increased the reaction rate and throughput of the reactor as shown by the reaction times given in Table 5. The nitric acid resulted in a more complete reaction as evidenced by the texture and physical properties of the effluent and did so in less than half the time of the sulfuric acid only runs. The faster reaction time was reflected in the amount of heat produced by each run. The nitric acid run produced significantly more heat in less time than the sulfuric acid runs.

Example 5

In this example, sewage was processed in a continuous tubular reactor to produce fertilizer and/or otherwise treat the sewage to render it suitable to be discharged into the environment. The sewage was obtained from a sewage treatment plant and contained approximately 5.5 wt % solids with the rest being almost entirely water. The solid particles in the sewage were suspended in the liquid so that the texture of the sewage resembled a readily pourable slurry.

The sewage was processed in a cutter and then a grinder to reduce the size of the solid particles and provide the sewage with a uniform particle size distribution. The sewage was not dewatered. The sewage was fed into a heat exchanger and later a reactor in by a Williams pump, an air driven cylinder that pressurized the sewage to approximately 2070 kPa. A single pump was used that created a pulsed flow—i.e., the sewage flowed when the cylinder was pushing sewage, but no sewage flowed when the sewage was being refilled.

The sewage was heated in the heat exchanger to approximately 180° C. The sewage was on the shell side of the heat exchanger and heated water was on the tube side of the heat exchanger. The water was heated by passing it through a heat exchanger with the hot effluent from the reactor and another heat exchanger supplied with hot oil from an external heater.

The heated and pressurized sewage then entered the reactor where it was mixed with nitric acid, sulfuric acid, and oxygen gas. The reactor was a one inch carbon steel pipe lined with polytetrafluoroethylene (PTFE). The pipe included multiple turns and changes of direction to help mix the reaction mixture as it passed through the pipe. Nitric acid was added to the feedstock first followed by sulfuric acid. Oxygen gas was added last.

When the reaction mixture reached the end of the reactor, the pipe was initially cooled with a fan or a water cooling system. The effluent passed through a valve that lowered the pressure to close to atmospheric pressure. The effluent then passed through the previously mentioned heat exchanger. The effluent was then processed to separate the solids, remove heavy metals, and neutralize any residual acids.

Multiple runs were performed in this manner using different amounts of acids and/or oxygen. Runs 1-4 explore how the amount of acid affects the reaction and runs 5-7 explore how the amount of oxygen gas affects the reaction. The parameters for each run are shown below in Table 6.

TABLE 6

| | | | Run parameters | | | |
|---|---|---|---|---|---|---|
| | Feed (mL/ min) | Sulfuric Acid (mL/min) (93%) | Nitric Acid (mL/min) (54%) | Oxygen (L/min) | Feed-stock Temp (C.) | Re-action Temp (C.) | Temp change (C.) |
| Run 1 | 720 | 6.08 | 3.44 | Not measured | 176 | 172 | −4 |
| Run 2 | 720 | 7.6 | 4.3 | Not measured | 176 | 177 | 1 |
| Run 3 | 720 | 8.36 | 4.73 | Not measured | 176 | 180 | 4 |
| Run 4 | 800 | 5.32 | 2.58 | Not measured | 179 | 183 | 4 |
| Run 5 | 2000 | 22.8 | 12.9 | 16 | 169 | 173 | 4 |
| Run 6 | 2000 | 23.56 | 14.19 | 20 | 170 | 173 | 3 |
| Run 7 | 2000 | 24.32 | 12.9 | 6 | 172 | 181 | 9 |

Run 1 produced very little reaction with a drop in the temperature. The effluent was chunky, which indicated that it hadn't completely reacted. Run 1 likely could have benefitted from additional acid. Run 2 produced a small reaction with a small temperature rise. The effluent was still chunky. Run 2 likely could also have benefitted from additional acid.

Run 3 produced a good reaction with a good temperature rise. The effluent did not contain any chunks. This run had enough acid to oxidize the sewage material the desired amount. Run 4 began with higher acid levels until all of the process equipment was up to temperature. After a few hours the acid levels were lowered to the amount shown and a good reaction with a good temperature rise was still obtained. The effluent did not contain any chunks.

Runs 5-7 all produced a good reaction with a good temperature rise. However, the effluent in runs 5-6 was foamy and gelatin like and the solid particles would not settle. The additional acid in run 6 did not noticeably change the effluent. The effluent in run 7 was not foamy, chunky, or gelatin like and the solid particles settled out readily. The excess oxygen gas seems to be the cause of the less desirable effluent in runs 5-6.

It should be understood that although certain results are expressed as being more or less desirable, those results that are characterized as being less desirable are still a substantial improvement over existing sewage processing technology. Thus, the less desirable results can still be desirable in many situations.

ILLUSTRATIVE EMBODIMENTS

Reference is made in the following to a number of illustrative embodiments of the disclosed subject matter. The following embodiments illustrate only a few selected embodiments that may include one or more of the various features, characteristics, and advantages of the disclosed subject matter. Accordingly, the following embodiments should not be considered as being comprehensive of all of the possible embodiments.

The concepts and aspects of one embodiment may apply equally to one or more other embodiments or may be used in combination with any of the concepts and aspects from the other embodiments. Any combination of any of the disclosed subject matter is contemplated.

In one embodiment, a method comprises feeding waste material into a reactor that includes a reaction mixture, the waste material being at least part of the reaction mixture. The waste material is reacted with sulfuric acid in the reactor and the reaction mixture includes no more than approximately 7.5 wt % acid.

In another embodiment, the method comprises feeding waste material into a reactor and reacting the waste material with sulfuric acid in the reactor to produce an effluent. The effluent includes a solid component and a liquid component and the weight ratio of carbon to nitrogen in the solid component, on a dry basis, is at least two times the weight ratio of carbon to nitrogen in the liquid component.

In another embodiment, the method comprises reacting waste material with an oxidizing acid in a reactor to produce a first effluent, separating solids from the first effluent to produce a liquid effluent, and separating heavy metals from the liquid effluent.

The waste material may be any organic waste material. The waste material can have an organic content of at least 25 wt %, at least 50 wt %, or at least 75 wt % on a dry basis. The waste material can include sewage material such as dewatered sewage, sewage sludge, farm animal waste, or fruit and vegetable waste such as potato skins and the like. The waste material may be combined with recycled effluent from the reactor before the waste material enters the reactor. Additional acid may be combined with the waste material and recycled effluent before the waste material enters the reactor.

The acid may be combined with the waste material before the waste material enters the reactor. A portion of the effluent from the reactor may be recycled back to the reactor. The sulfuric acid and/or nitric acid may be combined with the waste material and/or recycled effluent before the waste material enters the reactor. The temperature in the reactor may be maintained at no more than approximately 210° C. and the pressure in the reactor may be maintained at at least 2070 kPa or at least 2800 kPa. The gas in the headspace of the reactor may be dispersed into the reaction mixture with an impeller or like device.

Oxygen gas may be supplied to the reactor to further facilitate the reaction. The concentration of dissolved and entrained gas in the gaseous portion of the reaction mixture may be maintained within approximately 25% of the concentration of oxygen gas in the headspace of the reactor. The gas in the headspace of the reactor may comprise at least 25 volume percent oxygen gas or at least 40 volume percent oxygen gas.

The solids may be separated from the effluent to produce a liquid effluent. The solids may be separated from the effluent by filtering the effluent. The heavy metals may be separated from the liquid component of the effluent. At least approximately 80 wt % of arsenic, cadmium, cobalt, mercury, molybdenum, and/or selenium may be separated from the liquid component of the effluent.

The reaction mixture may include an oxidizing acid such as sulfuric acid and/or nitric acid. The reaction mixture may include no more than approximately 5 wt % acid or no more than approximately 3 wt % acid. The reaction mixture may include no more than approximately 5 wt % sulfuric acid or no more than approximately 3 wt % sulfuric acid. The reaction mixture may include sulfuric acid, nitric acid, or some other oxidizing acid. The weight ratio of sulfuric acid to nitric acid can at least approximately 0.5, at least approximately 0.75, at least approximately 1, or at least approximately 1.5. The pH of the reaction mixture may be approximately 0.5 to 2.0, approximately 0.75 to 1.75, or approximately 0.9 to 1.5.

The heavy metals may be separated form the liquid effluent by precipitating the heavy metals from the liquid effluent. The heavy metals can also be separated form the liquid effluent by contacting the liquid effluent with an ion exchange material or activated carbon. The heavy metals can also be separated from the liquid effluent by adding ferric oxide to the liquid effluent. The solids can be separated from the first effluent by filtering the effluent.

At least approximately 80 wt % or approximately 90 wt % of arsenic, cadmium, cobalt, mercury, molybdenum, and/or selenium may be separated from the liquid effluent. The weight ratio of carbon to nitrogen in the solid component, on a dry basis, may be more than four times, five times, or six times the weight ratio of carbon to nitrogen in the liquid component.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method comprising:
   reacting an organic feedstock in a pressurized reactor, the organic feedstock being part of a reaction mixture that includes sulfuric acid and nitric acid; and
   supplying oxygen to the reaction mixture;
   wherein the reaction mixture is at least 60° C.; and
   wherein the reaction mixture, excluding solids, includes no more than 7.5 wt % of the total of the sulfuric acid and the nitric acid.

2. The method of claim 1 wherein the organic feedstock includes sewage material.

3. The method of claim 1 wherein the weight ratio of solids in the organic feedstock to the total of the sulfuric acid and the nitric acid is at least 0.2.

4. The method of claim 1 wherein the weight ratio of solids in the organic feedstock to the nitric acid is at least 0.5.

5. The method of claim 1 wherein the weight ratio of solids in the organic feedstock to the sulfuric acid is at least 0.3.

6. The method of claim 1 wherein the pressure in the reactor is at least 1035 kPa.

7. The method of claim 1 wherein the temperature of the reaction mixture is at least 150° C.

8. The method of claim 1 wherein supplying oxygen to the reaction mixture includes supplying oxygen gas to the reaction mixture.

9. The method of claim 1 wherein the reaction mixture, excluding solids, includes no more than 5 wt % of the total of the sulfuric acid and the nitric acid.

10. A method comprising:
reacting an organic feedstock in a pressurized reactor, the organic feedstock being part of a reaction mixture that includes sulfuric acid and nitric acid; and
supplying oxygen to the reaction mixture;
wherein the reaction mixture is at least 60° C.; and
wherein the reaction mixture, excluding solids, includes no more than 5 wt % of the sulfuric acid.

11. The method of claim 10 wherein the organic feedstock includes sewage material.

12. The method of claim 10 wherein the weight ratio of solids in the organic feedstock to the total of the sulfuric acid and the nitric acid is at least 0.2.

13. The method of claim 10 wherein the weight ratio of solids in the organic feedstock to the nitric acid is at least 0.5.

14. The method of claim 10 wherein the weight ratio of solids in the organic feedstock to the sulfuric acid is at least 0.3.

15. The method of claim 10 wherein the pressure in the reactor is at least 1035 kPa.

16. The method of claim 10 wherein the temperature of the reaction mixture is at least 150° C.

17. The method of claim 10 wherein supplying oxygen to the reaction mixture includes supplying oxygen gas to the reaction mixture.

18. The method of claim 10 wherein the reaction mixture, excluding solids, includes no more than 3 wt % of the sulfuric acid.

19. A method comprising:
reacting an organic feedstock in a pressurized reactor, the organic feedstock being part of a reaction mixture that includes sulfuric acid and nitric acid; and
supplying oxygen to the reaction mixture;
wherein the reaction mixture is at least 60° C.; and
wherein the reaction mixture, excluding solids, includes no more than 1 wt % nitric acid.

20. The method of claim 19 wherein the organic feedstock includes sewage material.

21. The method of claim 19 wherein the weight ratio of solids in the organic feedstock to the total of the sulfuric acid and the nitric acid is at least 0.2.

22. The method of claim 19 wherein the weight ratio of solids in the organic feedstock to the nitric acid is at least 0.5.

23. The method of claim 19 wherein the weight ratio of solids in the organic feedstock to the sulfuric acid is at least 0.3.

24. The method of claim 19 wherein the pressure in the reactor is at least 1035 kPa.

25. The method of claim 19 wherein the temperature of the reaction mixture is at least 150° C.

26. The method of claim 19 wherein supplying oxygen to the reaction mixture includes supplying oxygen gas to the reaction mixture.

* * * * *